US011157882B1

(12) United States Patent
Liu et al.

(10) Patent No.: US 11,157,882 B1
(45) Date of Patent: Oct. 26, 2021

(54) INTELLIGENT EVENT TRACKING SYSTEM

(71) Applicant: Citrix Systems, Inc., Fort Lauderdale, FL (US)

(72) Inventors: Yimin Liu, Nanjing (CN); Sai Xu, Nanjing (CN); Xin Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/140,406

(22) Filed: Jan. 4, 2021

Related U.S. Application Data

(63) Continuation of application No. PCT/CN2020/136677, filed on Dec. 16, 2020.

(51) Int. Cl.
| G06Q 10/10 | (2012.01) |
| H04L 29/06 | (2006.01) |
| G06Q 10/06 | (2012.01) |
| G06Q 10/08 | (2012.01) |
| G06Q 10/00 | (2012.01) |

(52) U.S. Cl.
CPC ......... G06Q 10/1095 (2013.01); G06Q 10/00 (2013.01); G06Q 10/0631 (2013.01); G06Q 10/06314 (2013.01); G06Q 10/083 (2013.01); G06Q 10/10 (2013.01); G06Q 10/109 (2013.01); G06Q 10/1093 (2013.01); H04L 63/083 (2013.01); H04L 63/102 (2013.01)

(58) Field of Classification Search
CPC ............. G06Q 10/1095; G06Q 10/109; G06Q 10/083; G06Q 10/00; G06Q 10/06314; G06Q 10/0631; G06Q 10/1093; G06Q 10/10; H04L 63/102; H04L 63/083
See application file for complete search history.

(56) References Cited

U.S. PATENT DOCUMENTS

| 8,996,482 | B1 * | 3/2015 | Singh ................... G06F 16/27 707/698 |
| 10,073,979 | B2 * | 9/2018 | Von Kaenel ............ G06F 16/00 |
| 10,476,860 | B1 | 11/2019 | Lusk et al. |
| 2008/0005729 | A1 * | 1/2008 | Harvey ............... G06F 9/44521 717/155 |
| 2008/0079578 | A1 * | 4/2008 | Kim ....................... H04W 88/02 340/572.1 |
| 2009/0164910 | A1 * | 6/2009 | Laakso ................ G06Q 10/109 715/748 |
| 2015/0020147 | A1 * | 1/2015 | Krishnan ............. G06F 21/6218 726/1 |
| 2015/0262224 | A1 | 9/2015 | Brown et al. |
| 2017/0085447 | A1 * | 3/2017 | Chen ..................... H04L 43/024 |
| 2017/0357917 | A1 * | 12/2017 | Holmes ............ G06Q 10/06314 |
| 2018/0144103 | A1 * | 5/2018 | Chae ..................... G16H 50/80 |

(Continued)

OTHER PUBLICATIONS

International Search Report and Written Opinion dated Sep. 16, 2021 for International Patent Application No. PCT/CN2020/136677.

*Primary Examiner* — Michael A Keller
(74) *Attorney, Agent, or Firm* — Pierce Atwood LLP

(57) ABSTRACT

A first computing system may determine that a first event is represented in first data received from a second computing system. Based at least in part on the first event being represented in the first data, the first computing system may generate a time-ordered schedule of events that includes an indication of the first event, and may send, to a client device, second data representing the time-ordered schedule of events.

21 Claims, 16 Drawing Sheets

(56) References Cited

U.S. PATENT DOCUMENTS

| | | | | |
|---|---|---|---|---|
| 2018/0276621 | A1* | 9/2018 | Madejczyk | G06Q 10/06 |
| 2018/0349469 | A1 | 12/2018 | Toudji et al. | |
| 2019/0005458 | A1* | 1/2019 | Mallipudi | G06Q 10/1093 |
| 2019/0095478 | A1* | 3/2019 | Tankersley | G06F 16/2379 |
| 2019/0098066 | A1* | 3/2019 | Nielsen | H04L 65/607 |
| 2019/0245856 | A1* | 8/2019 | Irwan | G06F 15/76 |
| 2019/0362253 | A1* | 11/2019 | Francis | H04L 51/04 |

* cited by examiner

Event Schedule - December 15, 2020

| Time | Event | Quick Actions | | |
|---|---|---|---|---|
| 9:00 AM | Appointment with Dr. Smith | Cancel | Reschedule: | More |
| 11:00 AM | GoToMeeting with Sara Jones | Cancel | Reschedule: | More |
| 4:35 PM | Flight Departs from Boston to Los Angeles | Cancel | Reschedule: | More |

| User ID | SOR ID | RESTful URL | Authentication Method | Access Credentials | URI |
|---|---|---|---|---|---|
| U1 | SOR1 | URLA | Method A | C1 | URIA |
| U1 | SOR2 | URLB | Method A | C2 | URIB |
| U1 | SOR3 | URLC | Method B | C3 | URIC |
| U1 | SOR4 | URLD | Method C | C4 | URID |

| Column of SOR Table | Column of "Active Event" Table |
|---|---|
| Ticket ID | Event ID |
| Aircraft Departure Time | Start Time |
| Aircraft Arrival Time | End Time |
| Place of Destination and Departure | Description |

| User ID | SOR ID | Event ID | Start Time | End Time | Description |
|---|---|---|---|---|---|
| U1 | SOR1 | E1 | Date/Time A | Date/Time B | Catch a plane from Boston (BOS) to Los Angeles (LAX) |
| U1 | SOR2 | E2 | Date/Time C | Date/Time D | GoToMeeting with George |
| U1 | SOR3 | E3 | Date/Time E | Date/Time F | Appointment with Dr. Smith |
| U1 | SOR4 | E4 | Date/Time G | Date/Time H | Board train from Boston (North Station) to New York (Grand Central Station) |

1302 1304 1306 1308 1310 1312

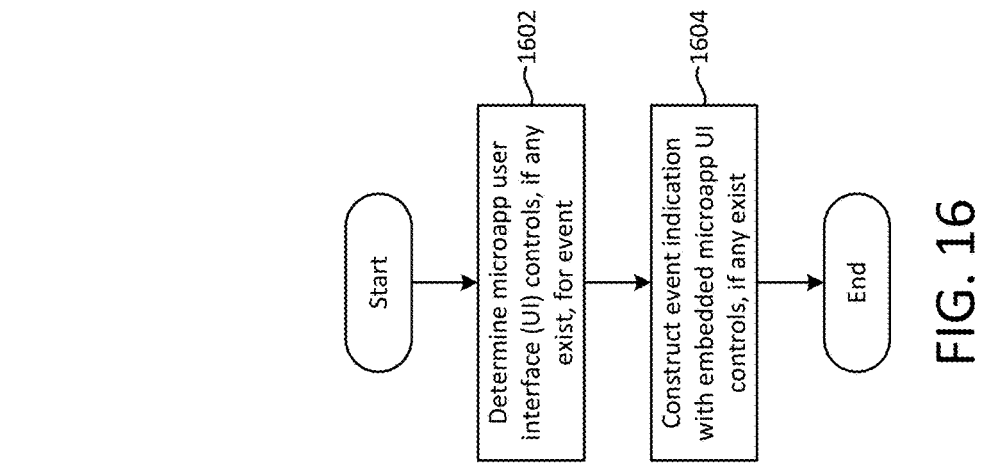
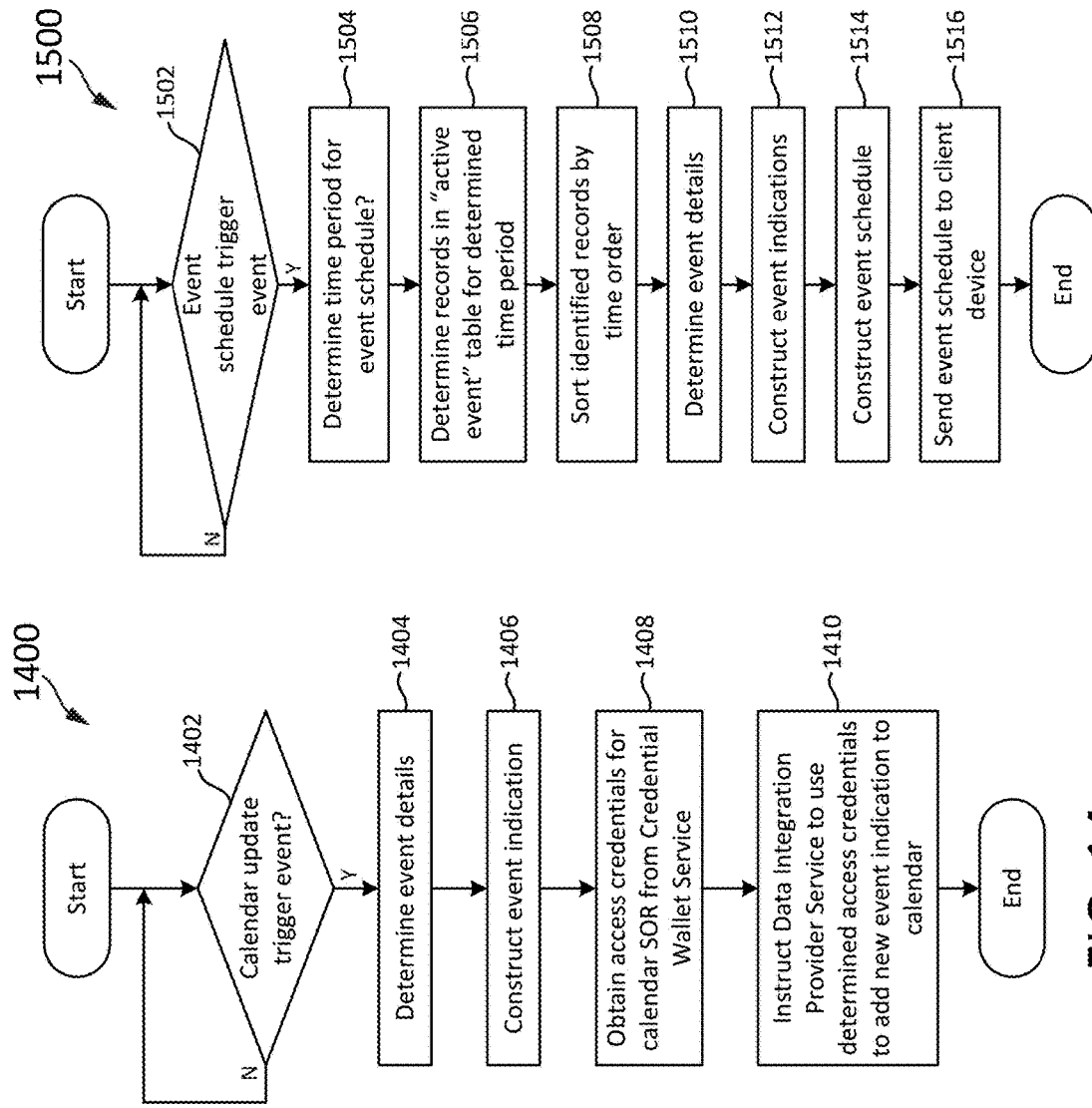

INTELLIGENT EVENT TRACKING SYSTEM

CROSS-REFERENCE TO RELATED APPLICATIONS

This application is a continuation of and claims the benefit under 35 U.S.C. § 120 and 35 U.S.C. § 365(c) to International Application PCT/CN136677, entitled INTELLIGENT EVENT TRACKING SYSTEM, with an international filing date of Dec. 16, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a first computing system, that a first event is represented in first data received from a second computing system; generating, by the first computing system and based at least in part on the first event being represented in the first data, a time-ordered schedule of events that includes an indication of the first event; and sending, from the first computing system to a client device, second data representing the time-ordered schedule of events.

In some disclosed embodiments, a system includes at least one processor and at least one computer-readable medium encoded with instructions which, when executed by the at least one processor, cause the first computing system to determine that a first event is represented in first data received from a second computing system, to generate, based at least in part on the first event being represented in the first data, a time-ordered schedule of events that includes an indication of the first event, and to send, to a client device, second data representing the time-ordered schedule of events.

In some disclosed embodiments, at least one non-transitory computer-readable medium is encoded with instructions which, when executed by at least one processor of a first computing system, cause the first computing system to determine that a first event is represented in first data received from a second computing system, to generate, based at least in part on the first event being represented in the first data, a time-ordered schedule of events that includes an indication of the first event, and to send, to a client device, second data representing the time-ordered schedule of events.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1D shows an example user interface window that includes a time-ordered sequence of events together with embedded user interface elements corresponding to actions that the user can take concerning the indicated events;

FIG. 11 shows a first example table in which configuration data for the intelligent event tracking system disclosed herein may be stored;

FIG. 12 shows a second example table in which configuration data for the intelligent event tracking system disclosed herein may be stored;

FIG. 13 shows an example table in which some embodiments of the intelligent event tracking system disclosed herein may store data concerning events detected in data received from one or more systems of record;

FIG. 14 shows an example routine that may be executed by the calendar updating service shown in FIG. 6;

FIG. 15 shows an example routine that may be executed by the event schedule generation service shown in FIG. 7; and FIG. 16 shows example steps that may optionally be performed by steps of the example routines shown in FIGS. 14 and 15.

DETAILED DESCRIPTION

For purposes of reading the description of the various embodiments below, the following descriptions of the sections of the specification and their respective contents may be helpful:

Section A provides an introduction to example embodiments of an intelligent event tracking system in accordance with the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the intelligent event tracking system introduced in Section A; and Section G describes example implementations of methods, systems/devices, and computer-readable media in accordance with the present disclosure.

A. Introduction to Illustrative Embodiments of an Intelligent Event Tracking System Maintaining an accurate "to-do" list can be critical for many individuals, and particularly for professionals in a computer-driven work environment. Users often employ a large number of disparate computer-implemented services to schedule various activities on a day-to-day basis. For instance, a user may schedule web-conferences using GoToMeeting, may purchase airline tickets from American Airlines, may purchase train tickets from Amtrak, and may use a Web portal to schedule doctor visits. Commonly, a user will maintain one or more calendars using an application or service (e.g., Microsoft Outlook, Google Calendar, etc.) to keep track of events the user has scheduled using various services. Typically, the responsibility for adding new events to a user's calendar, as well as making adjustments to existing events reflected on the user's calendar, resides with the user. As such, users may find it tedious to have to constantly add events to their calendars and/or update existing events on their calendars when they make changes using their various scheduling services, and/or may occasionally neglect to take such actions, thus resulting in calendars that do not accurately reflect the events the users currently have scheduled.

Figure 1A:
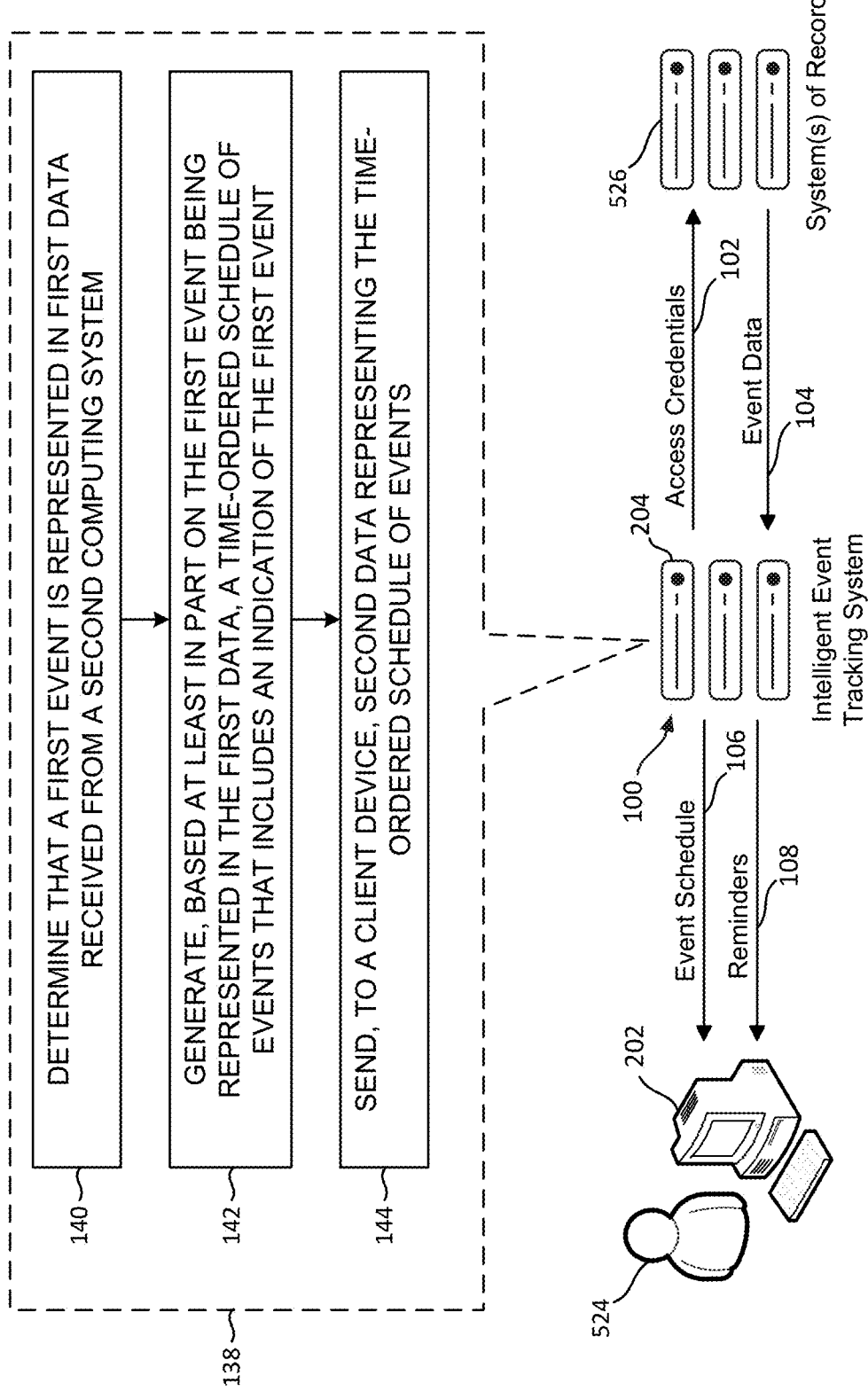
FIG. 1A is a high-level illustration of an intelligent event tracking system configured in accordance with some aspects of the present disclosure.

Offered is a system capable of automatically accessing data from various services used to schedule events and identifying data entries indicative of events a user has scheduled. Such identified data entries may then be used to construct a time-ordered sequence of events to present to the user, e.g., via a display screen of a client device. A high-level illustration of an example implementation of an intelligent event tracking system 100 including such capabilities is shown in FIG. 1A. As shown, in some implementations, the system 100 (which may include one or more servers 204—examples of which are described below) may use stored access credentials 102 for a user 524 to retrieve event data 104 from one or more systems of record 526. As described below in connection with FIG. 5C, the systems of record 526 may represent, among other things, numerous applications to which the user 524 has access rights (e.g., SaaS applications, web applications, Windows applications, Linux applications, etc.). The systems of record 526 shown in FIG. 1A may thus represent various services the user 524 can access to schedule events, such as web conferences, airline flights, train rides, doctor appointments, etc. The system 100 may use the retrieved event data 104 to construct a time-ordered sequence of identified events (potentially reflecting events indicated by multiple systems of record 526) for presentation to the user 524. As illustrated, the system 100 may communicate such a time-ordered sequence of events (e.g., as an event schedule 106) to a client device 202 (examples of which are described below) operated by the user 524. Further, as also illustrated, in some implementations, the intelligent event tracking system 100 may send one or more reminders 108 to the client device 202 as the time of an event indicated in the event schedule 106 approaches, e.g., twenty-four hours prior, one hour prior, fifteen minutes prior, five minutes prior, etc. The reminders may be provided in any of a number of ways and over any of a number of communications channels. Examples of possible reminder formats include emails, SMS messages, pop-up messages, etc.

Figures 1B, 1C:
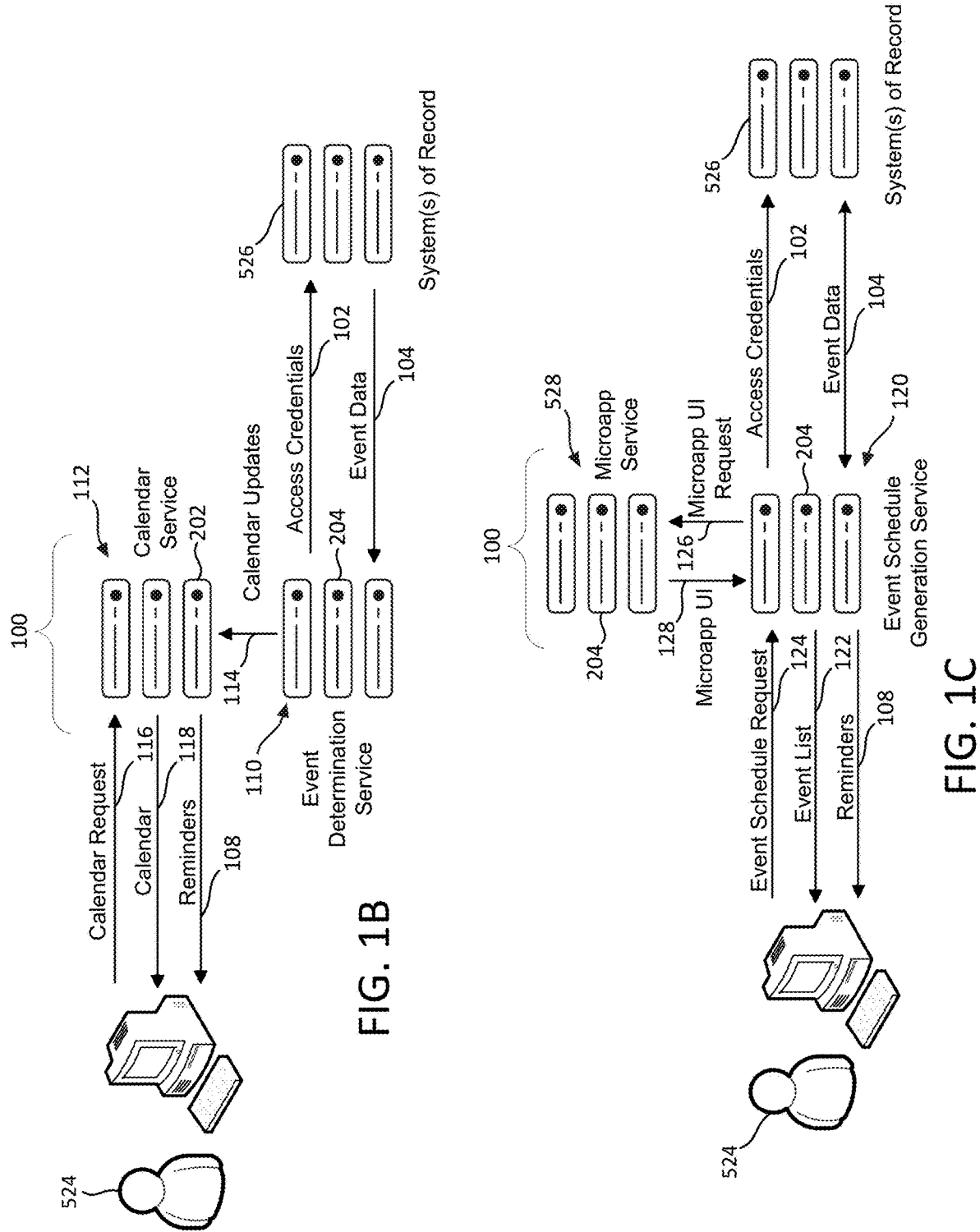
FIG. 1B shows a first example implementation of the intelligent event tracking system shown in FIG. 1A.
FIG. 1C shows a second example implementation of the intelligent event tracking system shown in FIG. 1A.

In some implementations, the system 100 may cause indications of newly-identified events, as well as indications of deletions of and/or updates to existing events, to be provided to a calendar service for the user, e.g., via an application programming interface (API) for Microsoft Outlook Calendar, Google Calendar, or the like. A high-level illustration of such an implementation is shown in FIG. 1B. As FIG. 1B illustrates, in such implementations, the system 100 may include both an event determination service 110 and a calendar service 112, each of which may be embodied by one or more servers 202. As illustrated, the event determination service 110 may use stored access credentials 102 for the user 524 to retrieve event data 104 from one or more systems of record 526, and may determine that the retrieved event data 104 is indicative of one or more events for the user 524. Upon identifying such an event, the event determination service 110 may instruct the calendar service 112, e.g., via a calendar update instruction 114, to update the user's calendar to reflect the identified event. In some implementations, for example, the event determination service 110 may use stored access credentials for the user's account with the calendar service 112 to authenticate to the calendar service 112 and update the user's calendar, e.g., using one or more API commands or otherwise. Subsequently, the client device 202 may send a calendar request 116 to the calendar service 112, and, in response, the calendar service 112 may return a calendar 118 reflecting the user's current event schedule 106. Further, as shown, the calendar service 112 may also send one or more reminders 108 to the client device 202 as the time of an event indicated in the calendar 118 approaches. Such reminders 108 may either be scheduled by the original calendar update instruction 114 for the event in question, or may be requested by subsequent instructions sent from the event determination service 110 to the calendar service 112.

Figure 5A:
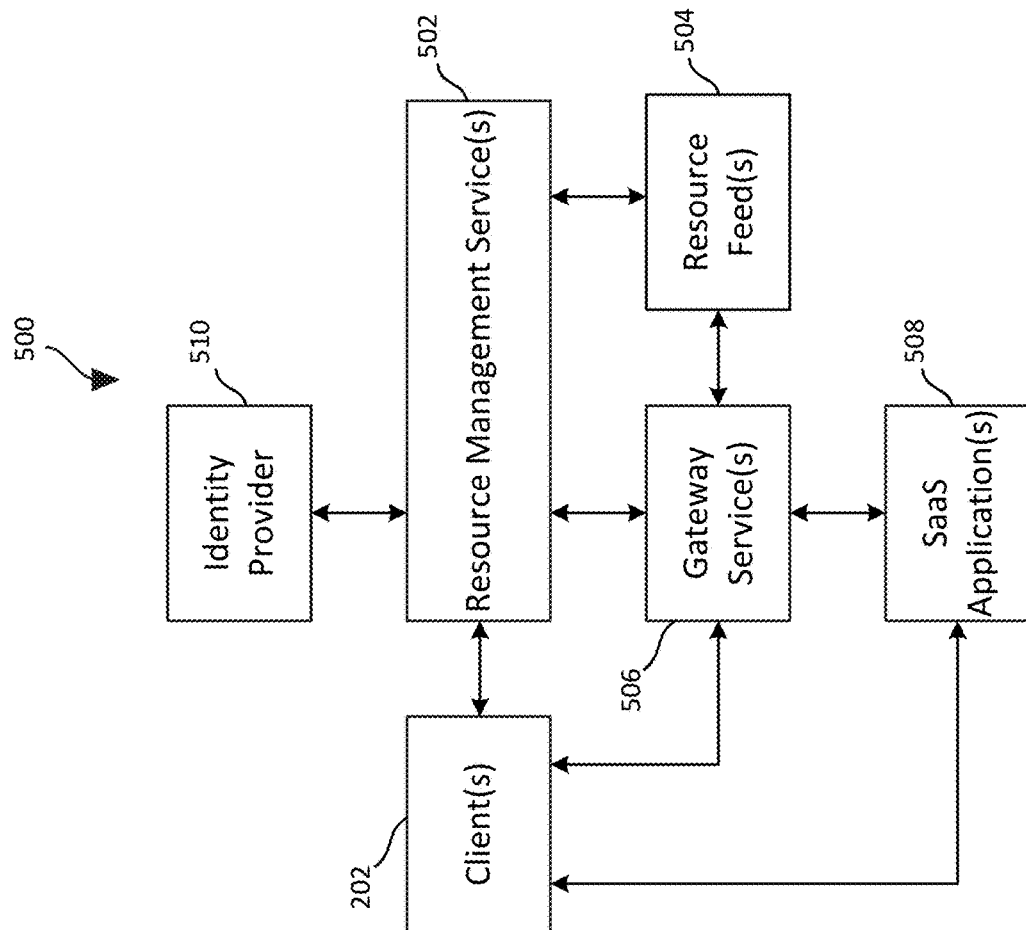
FIG. 5A is a block diagram of an example system in which resource management services may manage and streamline access by clients to resource feeds (via one or more gateway services) and/or software-as-a-service (SaaS) applications.
Figure 5B:
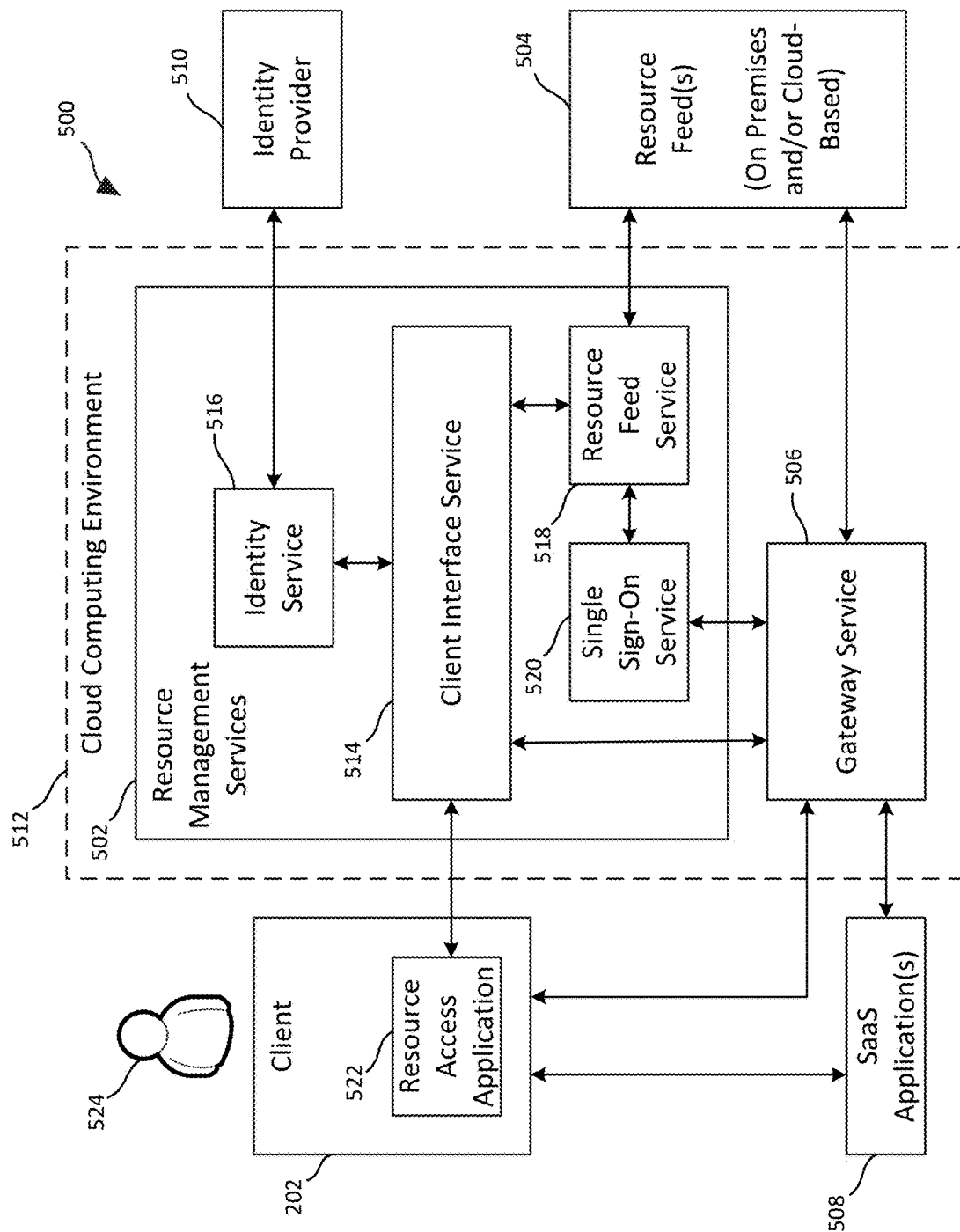
FIG. 5B is a block diagram showing an example implementation of the system shown in FIG. 5A in which various resource management services as well as a gateway service are located within a cloud computing environment.
Figure 5C:
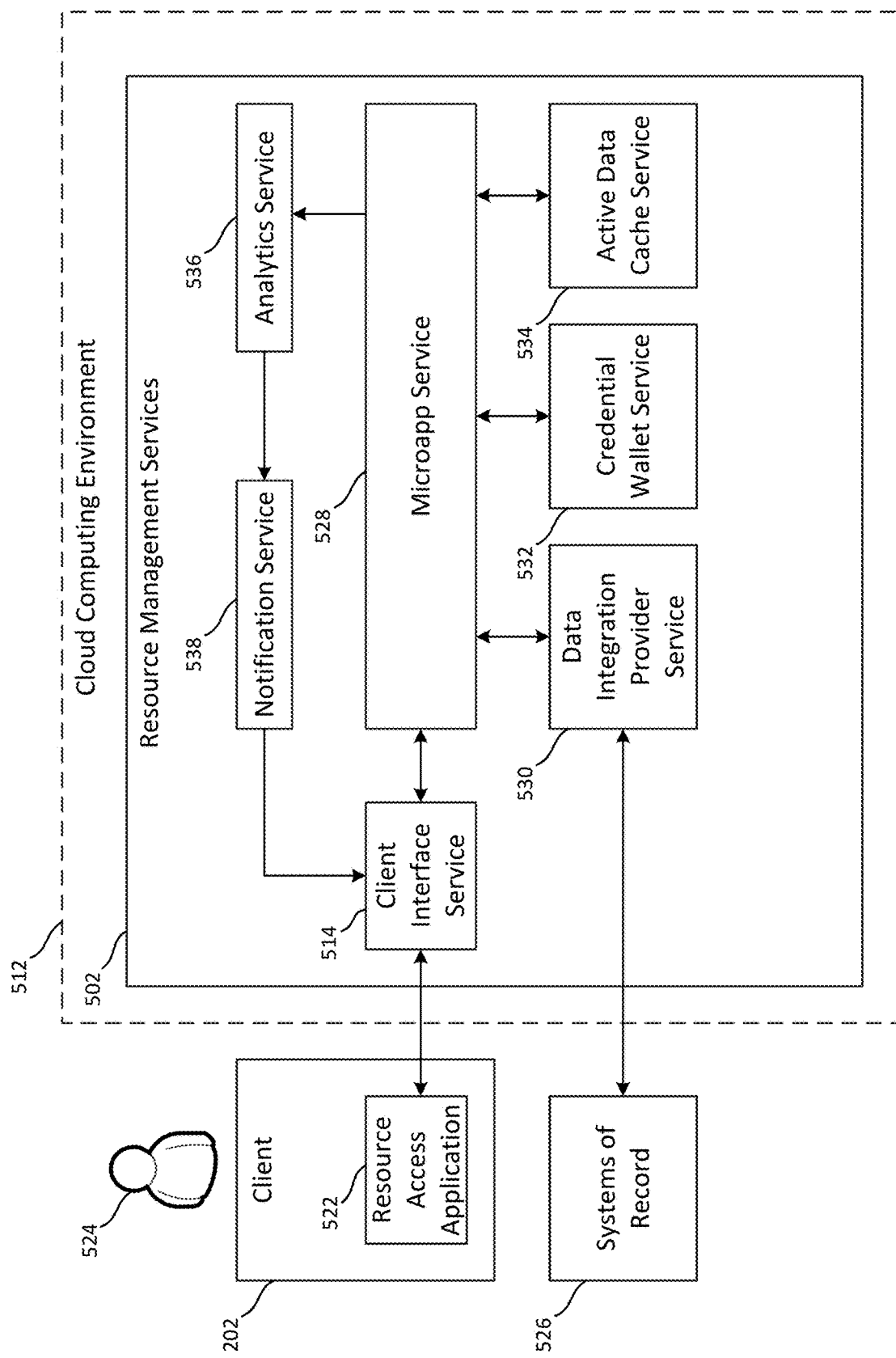
FIG. 5C is a block diagram similar to that shown in FIG. 5B but in which the available resources are represented by a single box labeled "systems of record," and further in which several different services are included among the resource management services.
Figure 5D:
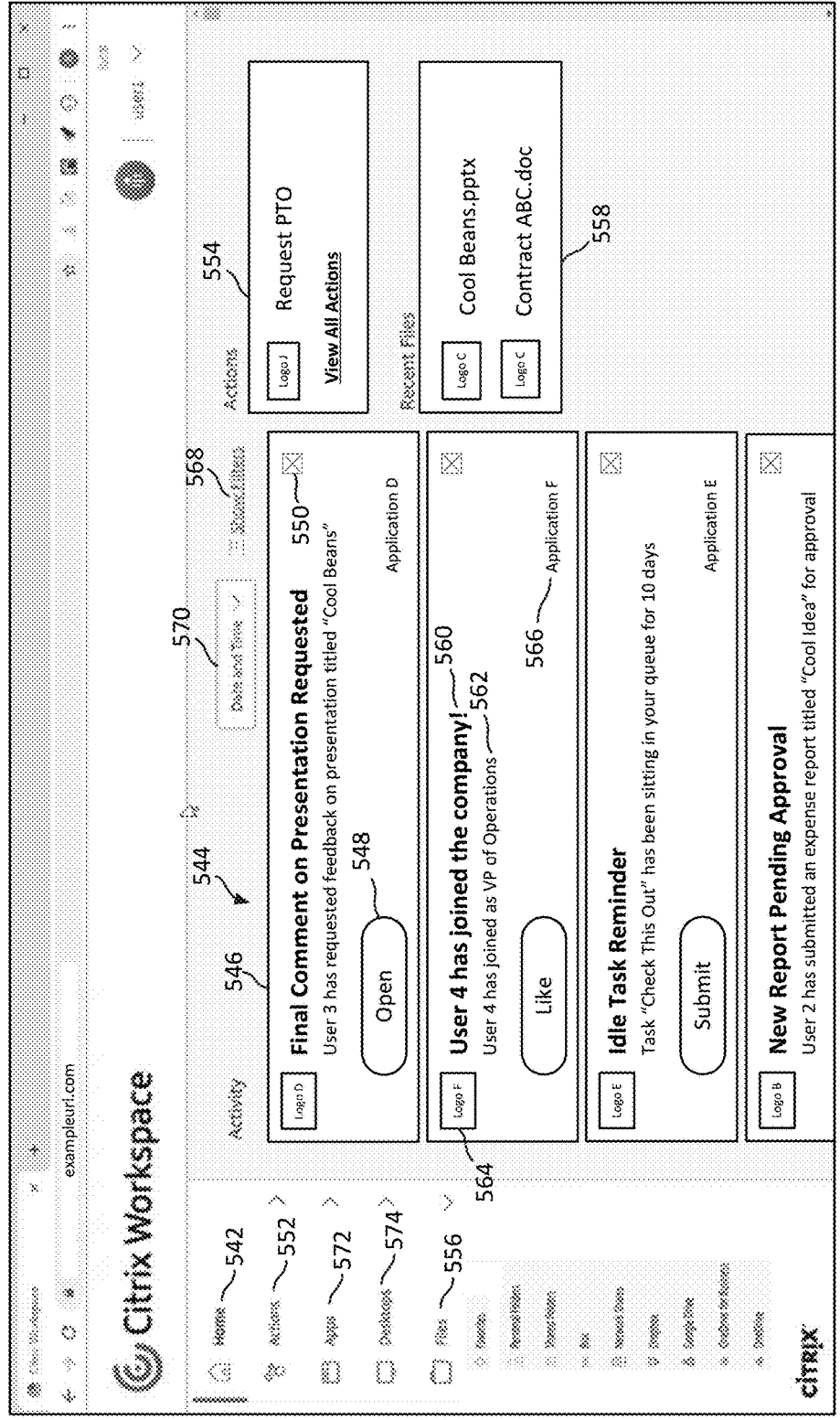
FIG. 5D shows how a display screen may appear when an intelligent activity feed feature of a multi-resource management system, such as that shown in FIG. 5C, is employed.

In other implementations, the system 100 may additionally or alternatively generate a user interface window including a list of the time-ordered sequence of events determined from retrieved event data 104, and may send a representation of that window to a client device 202 operated by the user 524, e.g., as a window presented within, or accessed via a user interface element of, a screen presented by a resource access application, such as the screen 540 (described below in connection with FIG. 5D) presented by the resource access application 522 (described below in connection with FIGS. 5B and 5D). In some implementations, for example, such a user interface window can be made available in response to the user 524 selecting a user interface element for an action named "event schedule," e.g., via a drop-down menu accessible using the "action" user-interface element 552 (shown in FIG. 5D), or in response to the user 524 selecting such an "event schedule" action from a list 554 of recently and/or commonly used microapp actions.

As shown in FIG. 1C, in some implementations, the system 100 may include an event schedule generation service 120 that is responsible for generating a user interface window including an event list 122 (corresponding the user's current event schedule 106) that is sent to the client device 202 in response to an event schedule request 124. The event schedule request 124 may, for example, be sent from the client device 202 to the event schedule generation service 120 in response to the user 524 selecting an "event schedule" action via the resource access application 522, as described above. In other implementations, a user interface window including the event list 122 may be presented as a standard feature within a designated area of the screen 540, without requiring a user 524 to select a user interface element to view it. As with the event determination service 110 shown in FIG. 1B, the event schedule generation service 120 may use stored access credentials 102 for the user 524 to retrieve event data 104 from one or more systems of record 526, and may determine that the retrieved event data 104 is indicative of one or more events for the user 524. The event schedule generation service 120 may further compile the identified events for the user 524 into the event list 122 that is sent to the client device 202.

Further, as also illustrated in FIG. 1C, in some implementations, the system 100 may additionally include a microapp service 528 (an example of which is described in Section E below). As shown, in such implementations, for respective events the event schedule generation service 120 identifies, the event schedule generation service 120 may send a request 126 to the microapp service 528 for one or more user interface (UI) elements corresponding to actions that can be taken by a system of record 526 with respect to the identified event. For at least some such events, the microapp service 528 may return one or more such UI elements 128 to the event schedule generation service 120. For example, in some implementations, the microapp service 528 may return a "cancel" UI element enabling a user 524 to cancel the indicated event and/or a "reschedule" UI element enabling a user 524 to reschedule it. In some implementations, the event schedule generation service 120 may then embed the returned UI elements 128 into the event list 122 adjacent the events to which they correspond.

In some implementations, the microapp service 528 may identify an existing microapp for enabling one or more actions for the event indicated in the request 126, and may return one or more corresponding UI elements 128 and/or a UI window including such elements for that microapp. For example, in some implementations, the analytics service 536 (shown in FIG. 5C) may likewise have detected an actionable event within a system of record 526 and generated a notification 546 for that event which included one or more selectable microapp UI elements 548 (shown in FIG. 5D). In some implementations, those same microapp UI elements 548 may be provided to the event schedule generation service 120 (e.g., as the UI elements 128) for inclusion in the event list 122 adjacent the events to which they correspond. In such implementations, the event schedule generation service 120 may thus rely upon operations already performed by the analytics service 536, together with the microapp service 528, to configure the microapp UI elements 548 to enable the microapp service 528 to take the appropriate actions with respect to the systems of record 526. In other words, in such implementations, the event schedule generation service 120 may simply request and receive from the microapp service 528, as the UI element(s) 128, one or more of the microapp UI elements 548 that have already been configured to take the indicated actions in connection with a notification 546 relating to the same actionable event.

In other implementations, the process used to build and/or select microapp UI elements 128 and/or a UI window including such elements for a detected event may instead be separate from but similar to the process the analytics service 536 and microapp service 528 use to build UI windows and/or select microapp UI elements for event notifications 546, as described below in connection with FIGS. 5C and 5D.

FIG. 1D shows an example user interface window 130 that includes a time-ordered sequence of events 122 together with embedded user interface elements 132, 134, 136 corresponding to actions that the user 524 can take concerning the respective events. In particular, in the illustrated example, selection of the "cancel" user interface element 132 may cause an instruction to be sent to the microapp service 528 that results in the microapp service 528 issuing a "cancel" instruction to the system of record 526 for the event, e.g., via the data integration provider service 530. Similarly, selection of the "reschedule" user interface element 134, together with the designation of a new date and/or time (e.g., via a pop-up calendar menu), may cause an instruction to be sent to the microapp service 528 that results in the microapp service 528 issuing a "reschedule" instruction to the system of record 526 for the event, e.g., via the data integration provider service 530. Finally, selection of the "more" user interface element, may cause the microapp service 528 to return a detailed window for a microapp for the system of record 526 to which the event relates. Such a detailed window may, for example, include additional descriptive information and/or one or more additional possible actions that can be taken with respect to the event, or perhaps with respect to other aspects of the user's account with the system of record 526.

Further, although not shown in FIG. 1B, it should be appreciated that, in some implementations, the event determination service 110 may similarly send requests 126 for microapp UI elements 128 to the microapp service 528 and may embed the microapp UI elements 128 it receives from the microapp service 528 into calendar entries it provides to the calendar service 112 (e.g., via the calendar update instructions 114). In such implementations, the system 100 may thus enable the user 524 to take the actions indicated by such microapp UI elements 128 directly from the user's calendar 118, e.g., by selecting a "cancel" user interface element 132, selecting a "reschedule" user interface element 134, selecting a "more" user interface element 136, or the like, presented within the calendar 118, such as described in connection with FIG. 1D. In some implementations, the system 100 may be configured to present the microapp UI elements 128 within calendar entries and/or to allow the user to 524 to take the indicated actions using such controls only if the system 100 can somehow determine that an adequate trust relationship exists between the client device 202 accessing the calendar service 112 and the microapp service 528, such as by confirming that the user 524 has been authenticated to both services via the single-sign on service 520 after authenticating to the identity provider 510 via resource access application 522 (as described in connection with FIG. 5B) or otherwise.

Further, in some implementations, rather than requesting microapp UI 128 elements from the microapp service 528 (e.g., via a request 126 as shown in FIG. 1C) and sending those elements to the calendar service 112 for inclusion in one or more calendar entries, the event determination service 110 may instead obtain indicators of such elements from the microapp service 528 and send those indicators (rather than the actual UI elements 128) to the calendar service 112. The calendar service 112 may then use such indicators to retrieve the indicated microapp UI elements 128 from the microapp service 528.

Referring again to FIG. 1A, an example routine 138 that may be performed by the disclosed intelligent event tracking system 100 will now be described.

As shown in FIG. 1A, at a step 140 of the routine 138, a first computing system (e.g., the intelligent event tracking system 100) may determine that a first event is represented in first data (e.g., the event data 104) received from a second computing system (e.g., a system of record 526).

At a step 142 of the routine 138, the first computing system (e.g., the intelligent event tracking system 100) may generate, based at least in part on the first event being represented in the first data (e.g., the event data 104), a time-ordered schedule of events (e.g., the event schedule 106) that includes an indication of the first event.

At a step 144 of the routine 138, the first computing system (e.g., the intelligent event tracking system 100) may send, to a client device (e.g., the client device 202), second data representing the time-ordered schedule of events (e.g., the event schedule 106).

Additional details and example implementations of embodiments of the present disclosure are set forth below in Section F, following a description of example systems and network environments in which such embodiments may be deployed.

B. Network Environment

Figure 2:
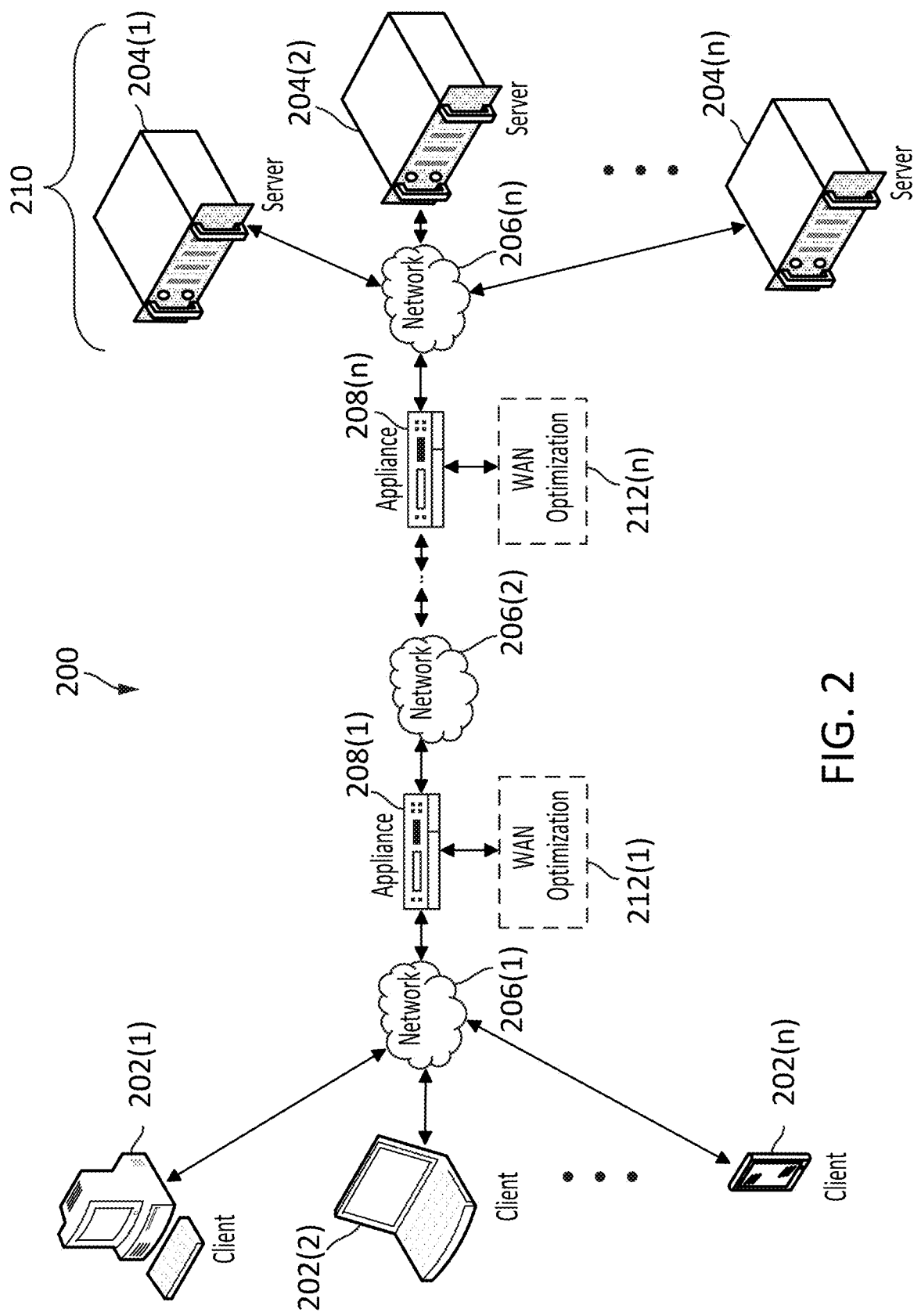
FIG. 2 is a diagram of a network environment in which some embodiments of the intelligent event tracking system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
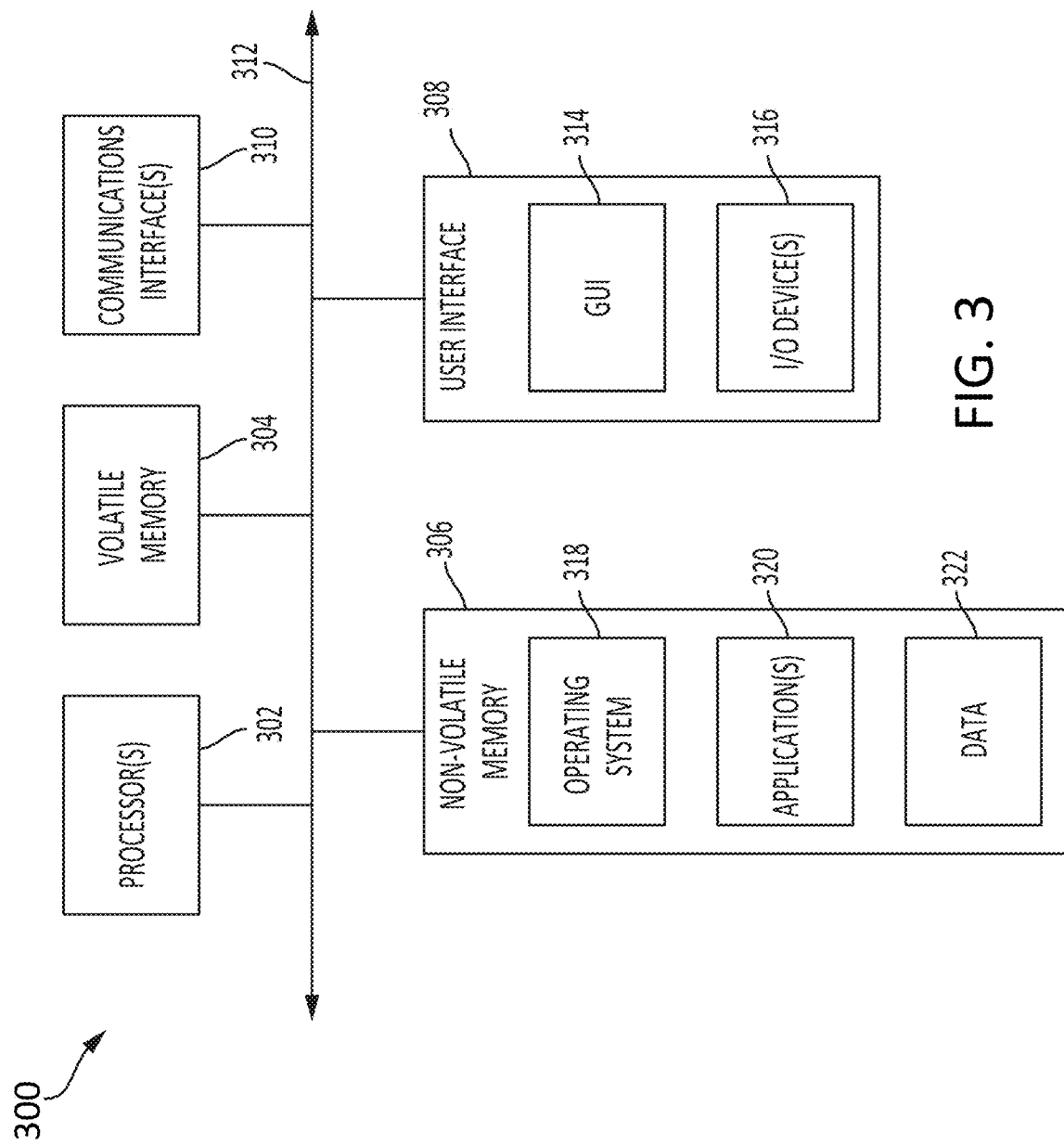
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
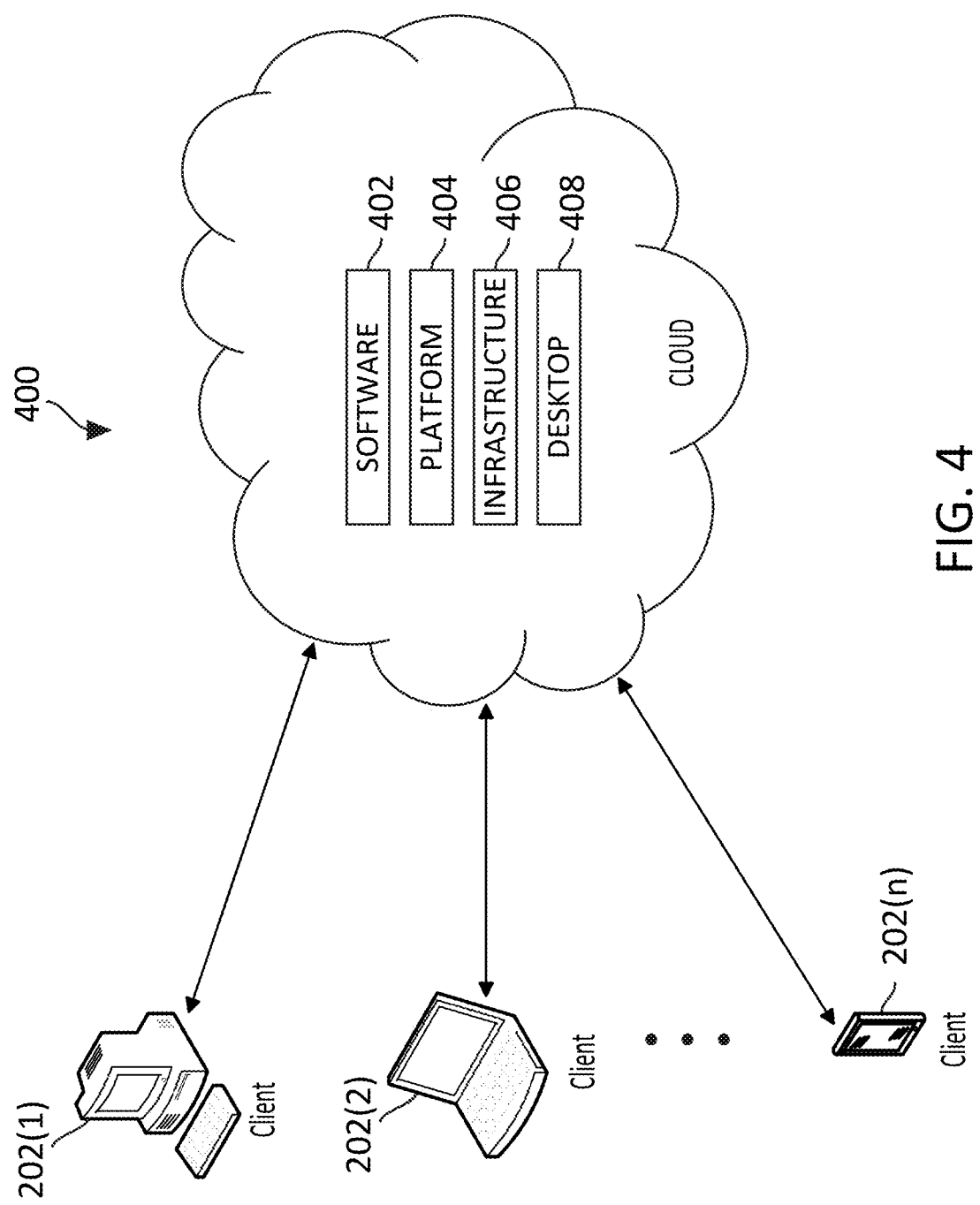
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Wash., Azure IaaS provided by Microsoft Corporation or Redmond, Wash., RACKSPACE CLOUD provided by Rackspace US, Inc., of San Antonio, Tex., Google Compute Engine provided by Google Inc. of Mountain View, Calif., and RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user-interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user-interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of an Intelligent Event Tracking System As described above in Section A, an intelligent event tracking system 100 may use access credentials 102 of a user 524 to retrieve event data 104 from one or more systems of record 526, and may evaluate the retrieved event data 104 to identify a time-ordered sequence of events to present to the user 524, e.g., as an event schedule 106 presented by the client device 202. Two alternative techniques for communicating such an event schedule 106 to a user 524 were introduced. First, as described in connection with FIG. 1B, in some implementations, an event determination service 110 may send calendar update instructions 114 concerning detected events to a calendar service 112, and the calendar service 112 may, in turn, provide the client device 202 with a calendar 118 reflecting the event schedule 106. Second, as described in connection with FIG. 1C, in other implementations, an event schedule generation service 120 may generate a time-ordered list of detected events and may send such a list directly to the client device 202, e.g., as a window containing an event list 122 corresponding to the event schedule 106. Further, as illustrated in FIG. 5D, in some implementations, the calendar 118 and/or event list 122 presented on the client device 202 may additionally include one or more embedded microapp UI elements 132, 134, 136 that may enable the user 524 to seamlessly take the actions indicated by such elements with respect to the systems or record 526 to which the indicated events relate.

Figure 6:
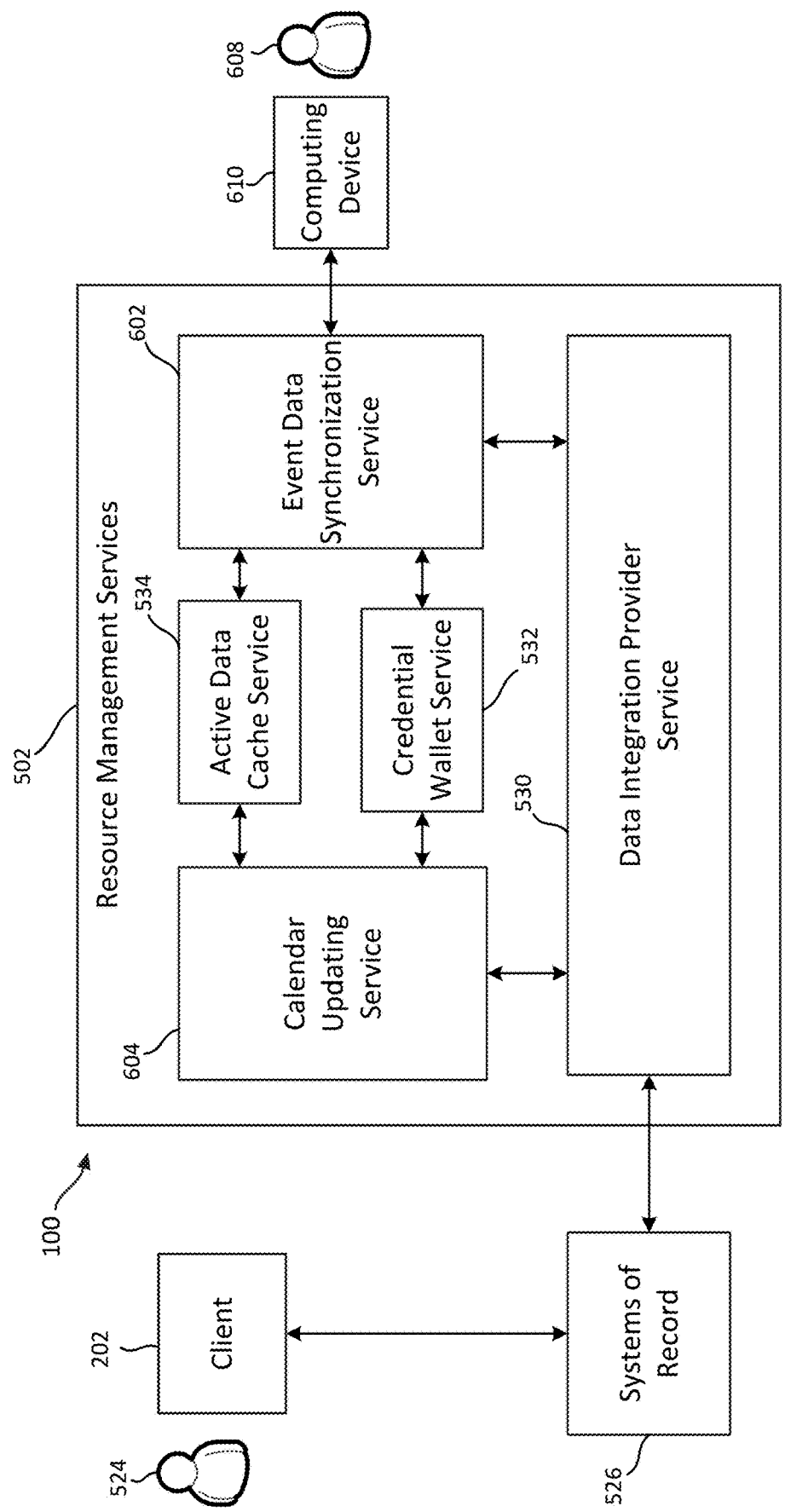
FIG. 6 shows example components that may be employed in connection with the illustrative implementation of the intelligent event tracking system shown in FIG. 1B.
Figure 7:
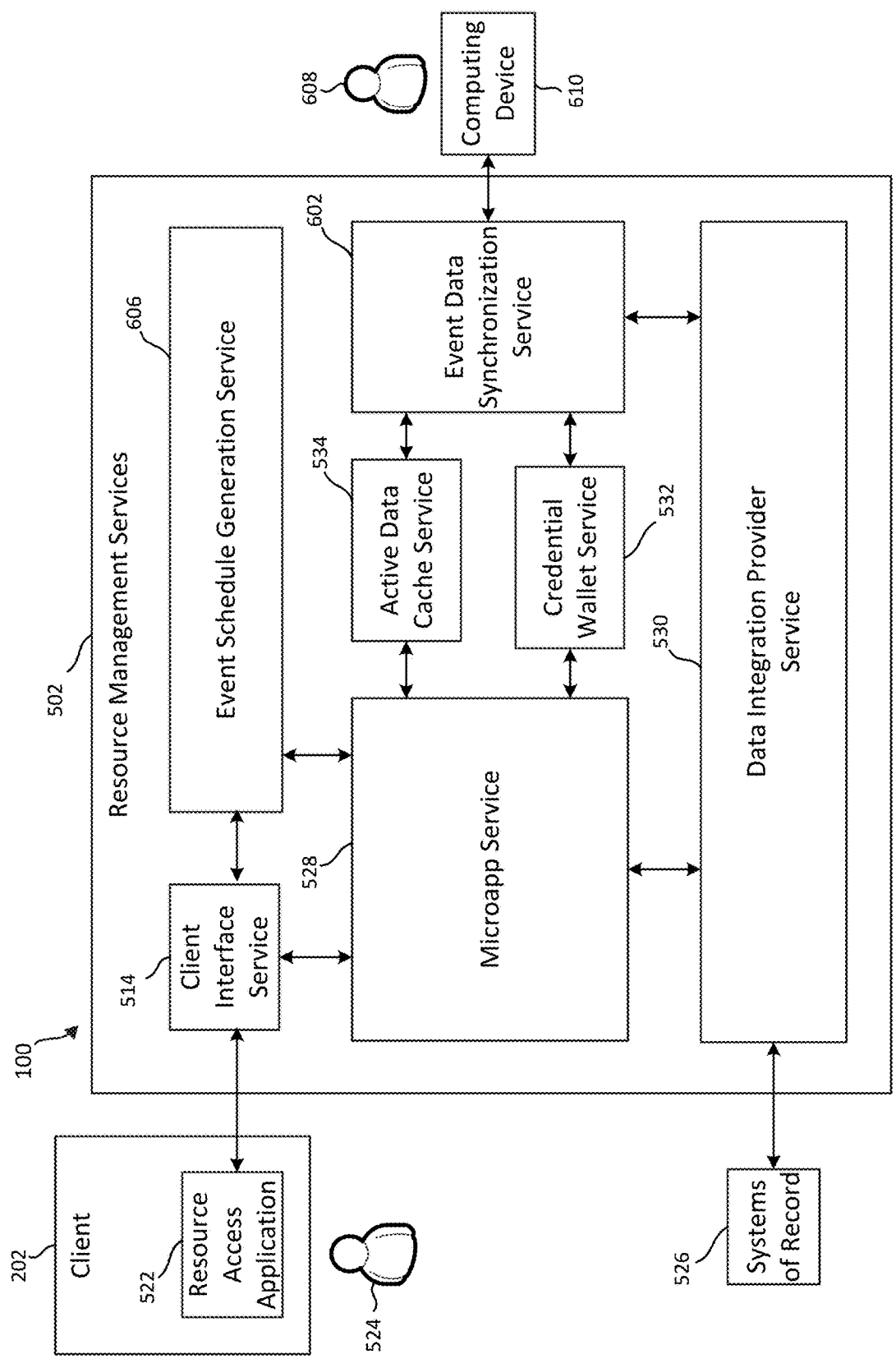
FIG. 7 shows example components that may be employed in connection with the illustrative implementation of the intelligent event tracking system shown in FIG. 1C.

FIG. 6 shows example components that may be employed in connection with the illustrative implementation of the system 100 shown in FIG. 1B. FIG. 7, on the other hand, shows example components that may be employed in connection with the illustrative implementation of the system 100 shown in FIG. 1C. Each of the components shown in FIGS. 6 and 7 may be embodied, for example, by one or more processors and one or more computer-readable media encoded with instructions which, when executed by the one or more processors, cause one or more computing systems to perform the functions described herein. As illustrated in FIGS. 6 and 7, in some implementations, the illustrated components may be included amongst the resource management services 502 of the multi-resource access system 500 that is described above (in Section E) in connection with FIGS. 5A-D.

As shown in FIGS. 6 and 7, in some implementations, the system 100 may include several of the same components as the multi-resource access system 500, including the data integration provider service 530, the credential wallet service 532, and the active data cache service 534. As will be described in more detail below, those components may serve essentially the same roles in the intelligent event tracking system 100 as they do in the multi-resource access system 500. Further, as shown in FIG. 7, in some implementations, the system 100 may additionally share the microapp service 528 and the client interface service 514 with the multi-resource access system 500.

As illustrated in FIGS. 6 and 7, in some implementations, the system 100 may additionally include an event data synchronization service 602. Similar to the microapp service 528 described above, the event data synchronization service 602 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the event data synchronization service 602. The event data synchronization service 602 may store the received systems of record data in the active data cache service 534 and/or may maintain a separate "active events" table for the user 524 that is based on the received systems of record data. An example of such an "active events" table 1200 is shown in FIG. 12, and the manner in which such a table 1200 may be populated and used by other system components to present an event schedule to a user 524 is described in detail below. In this regard, it should be appreciated that, in some implementations, the event data synchronization service 602 may instead rely on the systems of record data that the microapp service 528 writes to the active data cache service 534 as a part of its regular synchronization operations with the systems of record 526 (as described above in connection with FIG. 5C). In such implementations, the event data synchronization service 602 may maintain the "active events" table 1200 based on that systems of record data, rather than separately requesting that the data integration provider service 530 perform a data sync on its behalf.

An example routine 800 that may be performed by the event data synchronization service 602 is described below in connection with FIGS. 8 and 9. In implementations in which the event data synchronization service 602 relies upon the systems of record data that the microapp service 528 writes to the active data cache service 534, the event data synchronization service 602 may instead simply perform a step/routine 816 of the routine 800, which is illustrated in detail in FIG. 9, and may rely on the microapp service 528 to perform the remaining steps so as to retrieve the pertinent data from the various systems of record 526. In such implementations, the step/routine 816 may be performed either periodically or in response to a trigger event, such as receipt of an event schedule request 124, such as that illustrated in FIG. 1C.

Figure 8:
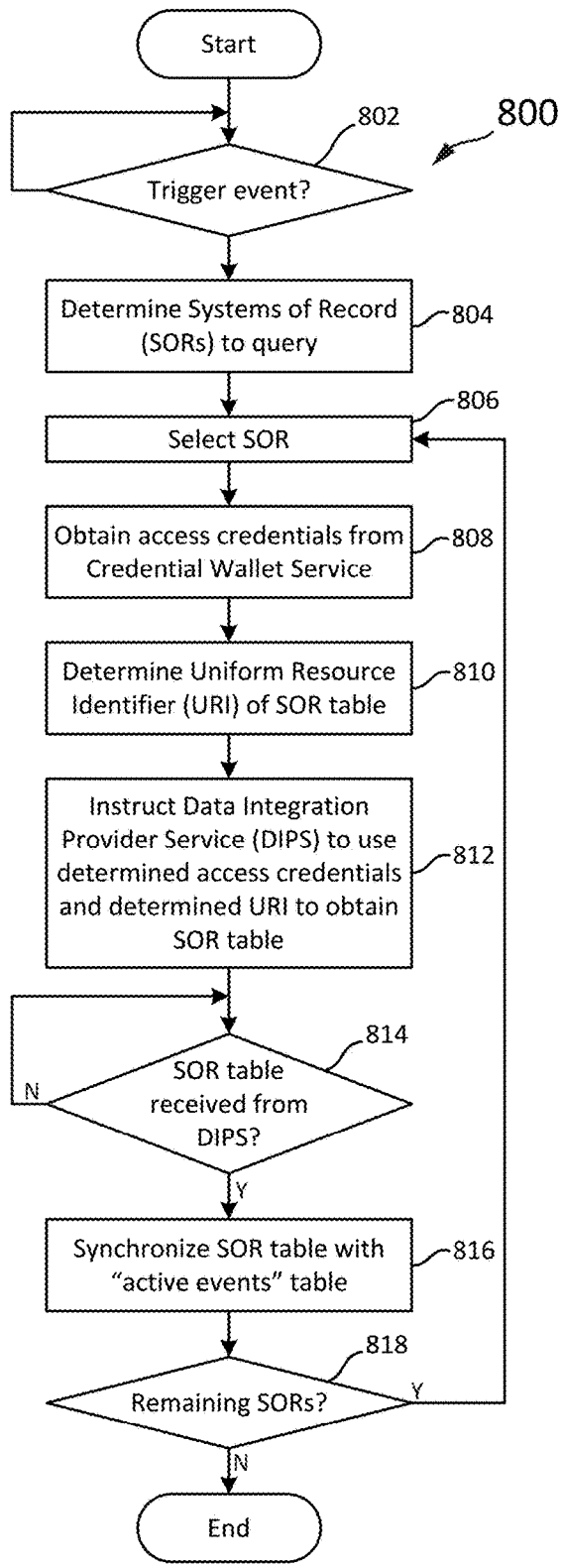
FIG. 8 shows an example routine that may be employed by event data synchronization service shown in FIGS. 6 and 7.

As shown in FIG. 8, the routine 800 may begin at a decision step 802 when the event data synchronization service 602 detects a trigger event for a data synchronization process. In some implementations, the trigger event detected at the decision step 802 may simply be a particular time of day, or the expiration of a timer for a particular time window, so as to cause the routine 800 to be performed periodically, e.g., once per day, once every four hours, once every hour, etc. In other implementations, the trigger event detected at the decision step 802 may additionally or alternatively be detection of a particular input, such when a user 524 launches a resource access application 522 and authenticates to the resource management services 502, or when an event schedule request 124 is received from the resource access application 522 (as shown in FIG. 1B).

As a step 804 of the routine 800, the event data synchronization service 602 may determine the systems of record 526 from which event data 104 is to be gathered for the purpose of identifying events to include on an event schedule 106. As discussed in more detail below in connection with FIGS. 10 and 11, in some implementations, a system administrator 608 (shown in FIGS. 6 and 7) may interface with a computing device 610 to configure the event data synchronization service 602 to identify the systems of record 526 that are likely to reflect such events, as well as to store information identifying RESTful service uniform resource locators (URLs), authentication methods, access credentials of the user 524, and uniform resource identifiers (URIs) of pertinent tables, for those systems of record 526.

An example "configuration" table 1100 that identifies several systems of record 526 for which such configuration data for a given user (as indicated by "User ID" entries 1102) has been provided is shown in FIG. 11. As shown in FIG. 11, in addition to system of record identifiers (SOR IDs) for respective systems of record 526 (as indicated by "SOR ID" entries 1104), the "configuration" table 1100 may include "RESTful URL" entries 1106 identifying application programming interface (API) URLs for the systems of record 526, "authentication method" entries 1108 identifying the authentication methods that are employed by the systems of record 526, "access credential" entries 1110 that identify the user's access credentials (e.g., user names and passwords) for the systems of record 526, and "URI" entries 1112 that identify particular tables or other resources within the systems of record 526 that are to be retrieved. In some implementations, for enhanced security, the "access credential" entries may be stored separately from the other data in the "configuration" table 1100, e.g., by the credential wallet service 532.

As shown in FIG. 8, per a selection step 806 and a decision step 818, the routine 800 may cycle through the systems of record 526 identified at the step 804 to retrieve data from one or more particular tables maintained by those systems (per steps 808, 810, 812 and 814) and synchronize (per the step/routine 816—described below in connection with FIG. 9) the respective retrieved tables with an "active events" table for the user 524. An example of such an "active events" table 1300 is shown in FIG. 13. Although FIG. 8 shows the steps 808, 810, 812, 814 and 816 being performed for systems of record 526 one at a time, it should be appreciated that those steps may instead be performed in parallel for some or all of the systems of record 526 at the same time. As explained in more detail below in connection with the step/routine 816 shown in FIG. 9, entries 1202 and 1204 in a "mapping" table 1200 (shown in FIG. 12) may be used to map columns from the tables retrieved from the respective systems of record 526 (referred to herein as "SOR tables") to appropriate columns in the "active events" table 1300. And as described below in connection with FIG. 10, in some implementations, the entries 1202, 1204 in the "mapping" table 1200 may be set by the system administrator 608 via the computing device 610 (shown in FIGS. 6 and 7).

Example implementations of the steps 808, 810, 812, and 816 of the routine 800, which may be performed for the respective systems of record 526 identified at the step 804, will now be described. At a step 808 of the routine 800, the event data synchronization service 602 may obtain the user's access credentials from the credential wallet service 532 (shown in FIGS. 6 and 7). As alluded to above, the access credentials obtained from the credential wallet service 532 at this step may correspond to the "access credentials" entries 1110 for the respective systems of record 526 (e.g., user names and passwords) that are indicated in the "configuration" table 1100 (shown in FIG. 11).

At a step 810 of the routine 800, the event data synchronization service 602 may determine the URI of one or more particular SOR tables that are to be retrieved from the system of record 526. The event data synchronization service 602 may, for example, use the "URI" entry 1112 for the pertinent system of record 526 (as indicated by the "SOR ID" entries 1104) in the "configuration" table 1100 for that purpose.

At a step 812 of the routine 800, the event data synchronization service 602 may instruct the data integration provider service 530 to use the access credentials determined at the step 808 to access the system of record 526 on behalf of the user 524, e.g., via the URL indicated by the corresponding "RESTful URL" entry 1106 in the "configuration" table 1100, and to retrieve the SOR table indicated by the URI determined at the step 808. In some implementations, for example, the data integration provider service 530 may send hypertext transport protocol (http) commands to the indicated RESTful URL to authenticate to the system of record 526 using the determined access credentials. Once authenticated, the data integration provider service 530 may use the determined URI to fetch the appropriate SOR table from the system of record 526.

Per a decision step 814, the event data synchronization service 602 may await receipt of the indicated SOR table from the data integration provider service 530.

Per the step/routine 816, after the indicated SOR table is received from the data integration provider service 530, the event data synchronization service 602 may synchronize the received SOR table with the "active events" table 1300 (shown in FIG. 13) for the user 524. As noted previously, an example implementation of the step/routine 816 is shown in FIG. 9.

The "mapping" table 1200 shown in FIG. 12 shows an example of how particular columns of an SOR table (i.e., a table retrieved from a system of record 526) may be mapped to a set of standard columns in the "active event" table 1300 (shown in FIG. 13). In the illustrated example, the mapping is for an SOR table retrieved from an airline booking service. Different "mapping" tables 1200 may be configured for respective systems of record 526, so as to appropriately map the columns from different types of SOR tables to the standard columns in the "active events" table 1300. As shown in FIG. 13, the "active events" table 1300 may include respective rows of entries for individual events that are indicated in the SOR tables retrieved from the systems for record 526. The columns of the "active events" table 1300 may represent characteristics or features of the events indicated by the respective rows. As shown, the events represented in the "active events" table 1300 may be correlated by user (e.g., via "user ID" entries 1302) and, for a given event, the "active events" table 1300 may identify the system of record 526 in which the event was detected (e.g., via an "SOR ID" entry 1304) as well as a unique identifier of the detected event within that system of record 526 (e.g., via an "Event ID" entry 1306). In some implementations, the "event ID" entry 1306 may correspond to the primary key for the event in a database of the system of record 526. For example, for an airline booking service, the "event ID" entry 1304 written to the "active events" table 1300 may be the "ticket ID" assigned by the airline, as that may be the primary key of the airline booking service's database. As discussed below in connection with FIG. 10, in some implementations, the mapping between columns of the SOR tables for respective systems of record 526 and the standard columns of the "active events" table 1300 may be set by the system administrator 608 (shown in FIGS. 6 and 7) as part of a process for configuring the event data synchronization service 602, e.g., via the computing device 610, to interface with different systems of record 526.

As shown in FIG. 13, in some implementations, in addition to columns for "user ID" entries 1302, "SOR ID" entries 1304, and "event ID" entries 1306, the "active events" table 1300 may include (A) a column for "start time" entries 1308 indicating a date and/or time at which the event is scheduled to begin, (B) a column for "end time" entries 1310 indicating a date and/or time at which the event is scheduled to end, and (C) a column for "description" entries 1312 including text describing the nature of the event. It should be appreciated that the information written to certain of the entries, and in particular the "description" entries 1312, may, in some implementations, be concatenated from multiple columns of the SOR table retrieved from the system of record 526 to which it relates, together with text from a template. For example, for an SOR table retrieved from an airline booking service, the "description" entries 1312 may be generated by using a template including a mixture of pre-defined text and placeholders for values from particular columns of a retrieved SOR table, such as "Catch a flight from [departure airport] to [destination airport]," where [departure airport] and [destination airport] represent values that are to be obtained from particular columns of the retrieved SOR table per a "mapping" table 1200.

Figure 9:
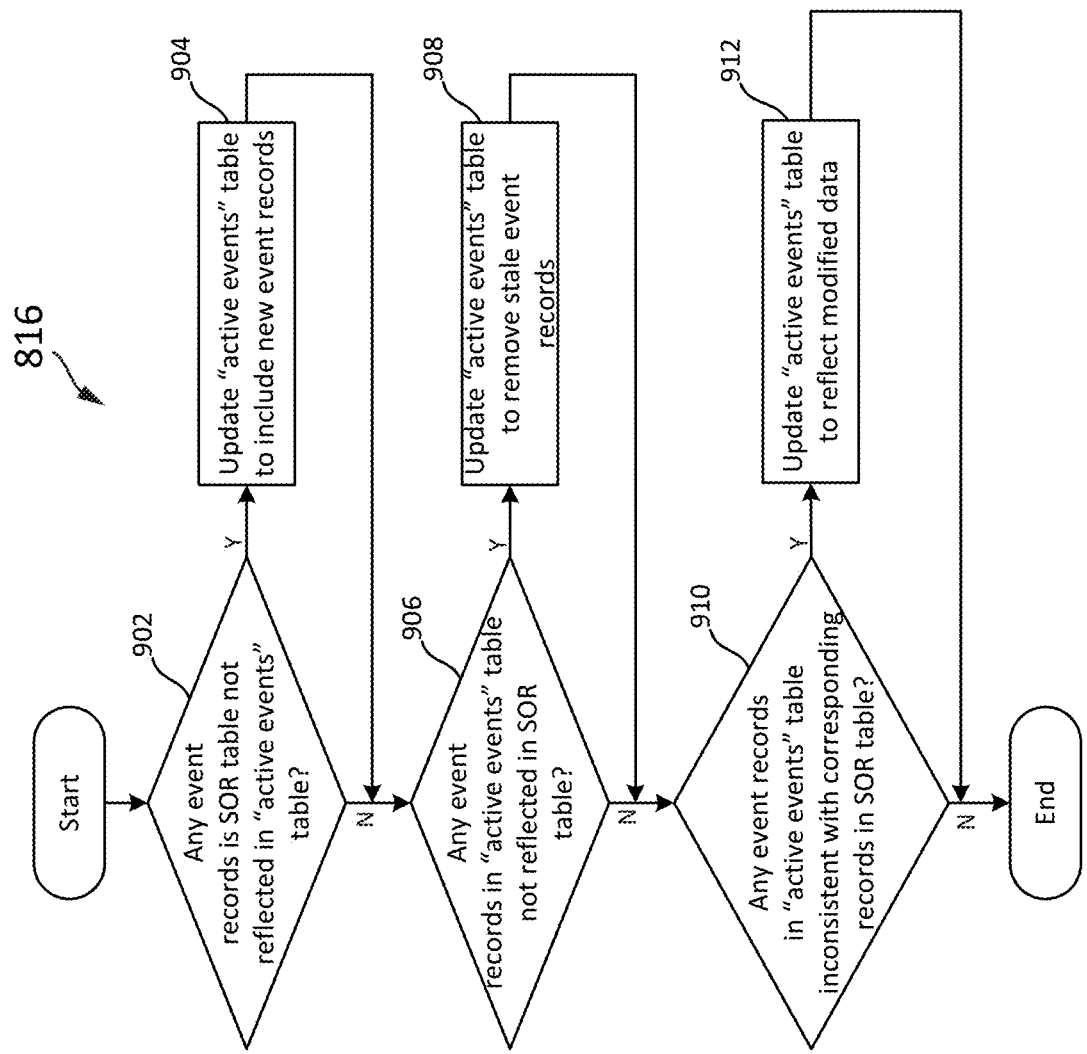
FIG. 9 shows an example implementation of one of the steps/routines shown in FIG. 8.

As shown in FIG. 9, at a decision step 902 of the step/routine 816, the event data synchronization service 602 may compare entries from certain columns of the retrieved SOR table with entries in the columns of the "active events" table 1300 to which they are mapped (e.g., by the "mapping" table 1200) to determine whether, for the mapped columns, the SOR table contains any records that are not included in the "active events" table 1300. When, at the decision step 902, the event data synchronization service 602 identifies records in the mapped columns of the retrieved SOR table that are absent from the corresponding columns of the "active events" table 1300, the step/routine 816 may proceed to a step 904, at which the event data synchronization service 602 may update the "active events" table 1300 to include the missing records. When, on the other hand, the event data synchronization service 602 does not identify (at the decision step 902) any records in the mapped columns of the retrieved SOR table that are absent from the corresponding columns of the "active events" table 1300, the step/ routine 816 may instead proceed to a decision step 906.

At the decision step 906 of the step/routine 816, the event data synchronization service 602 may compare entries in the columns of the "active events" table 1300 with entries in the columns of the retrieved SOR table to which they are mapped (e.g., by the "mapping" table 1200) to determine whether the "active events" table 1300 contains any records that are not included in the mapped columns of the retrieved SOR table. When, at the decision step 906, the event data synchronization service 602 identifies records in the columns of the "active events" table 1300 that are absent from the mapped columns of the retrieved SOR table, the step/ routine 816 may proceed to a step 908, at which the event data synchronization service 602 may update the "active events" table 1300 to remove those records. When, on the other hand, the event data synchronization service 602 does not identify (at the decision step 906) any records in the columns of the "active events" table 1300 that are absent from the corresponding columns of the retrieved SOR table, the step/routine 816 may instead proceed to a decision step 910.

At the decision step 910 of the step/routine 816, the event data synchronization service 602 may compare entries in the columns of the "active events" table 1300 with entries in the columns of the retrieved SOR table to which they are mapped (e.g., by the "mapping" table 1200) to determine whether the data for any records in "active events" table 1300 is different than the data for corresponding records in the mapped columns of the retrieved SOR table. When, at the decision step 910, the event data synchronization service 602 identifies one or more inconsistencies between the data for the compared records, the step/routine 816 may proceed to a step 912, at which the event data synchronization service 602 may update the "active events" table 1300 to include the modified data from the retrieved SOR table. When, on the other hand, the event data synchronization service 602 does not identify (at the decision step 910) any inconsistencies between the data for the compared records, the step/routine 816 may instead terminate.

Figure 10:
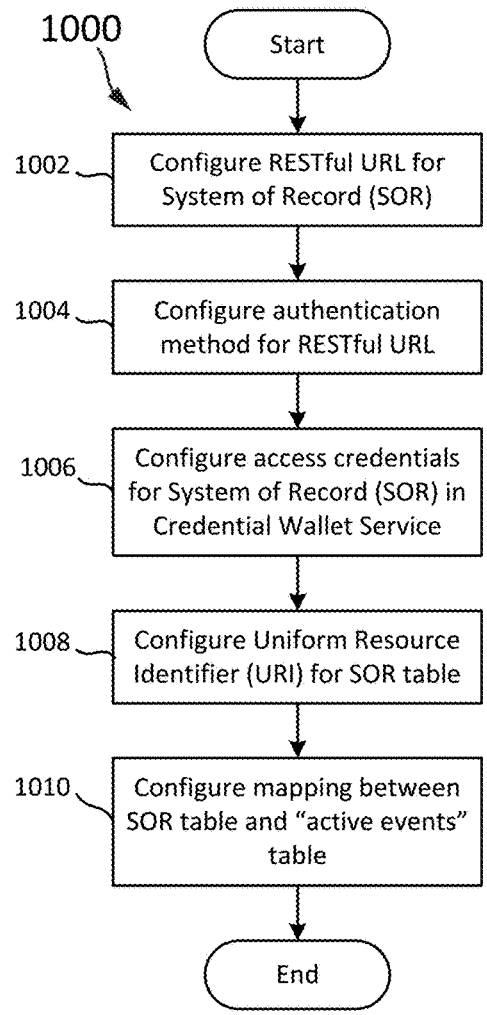
FIG. 10 shows an example routine that may be employed by the computing device shown in FIGS. 6 and 7 to configure certain features of the intelligent event tracking system disclosed herein.

FIG. 10 shows an example routine 1000 that may be performed by the computing device 610 (shown in FIGS. 6 and 7), as operated by the system administrator 608, to configure the event data synchronization service 602 to interface with a given system of record 526. In particular, the routine 1000 represents a process for configuring both (A) a new row of the "configuration" table 1100 (shown in FIG. 11), and (B) a new "mapping" table 1200 (shown in FIG. 12), so as to enable the event data synchronization service 602 to properly populate and maintain records in the "active events" table 1300 based on data retrieved from the system of record 526.

As shown in FIG. 10, the routine 1000 may begin at a step 1002, at which the computing device 610, e.g., per instructions entered by the system administrator 608, may determine the base RESTful URL that is to be used by the data integration provider service 530 to access the system of record 526, and may add that determined RESTful URL as a "RESTful URL" entry 1106 to a row of the "configuration" table 1100 that includes an "SOR ID" entry 1104 for the system of record 526 that is to be accessed as well as a "user ID" entry for the user 524 on whose behalf that system of record 526 is to be accessed.

At a step 1004 of the routine 1000, computing device 610, e.g., per instructions entered by the system administrator 608, may determine the authentication RESTful API and details of the particular authentication method that are to be used by the data integration provider service 530 to authenticate the user 524 to the system of record 526 associated with the base RESTful URL configured at the step 1002. That determined information may be added as an "authentication method" entry 1108 to the same row of the table as the "RESTful URL" entry 1106 that was added at the step 1002.

At a step 1006 of the routine 1000, computing device 610, e.g., per instructions entered by the system administrator 608 and/or in response to input by the user 524, such as when the user 524 registers a new system of record 526 with the system 100, may determine the authentication credentials of the user 524 that are to be used by the data integration provider service 530 to authenticate the user 524 to the system of record 526 associated with the base RESTful URL configured at the step 1002. In some implementations, the determined access credentials may be added as an "access credentials" entry 1110 to the same row of the table as the information that was added at the steps 1002 and 1004. In other implementations, as noted above, the user's access credentials may instead be maintained by the credential wallet service 532, rather than being added to the "configuration" table 1100.

At a step 1008 of the routine 1000, computing device 610, e.g., per instructions entered by the system administrator 608, may determine the URI of a particular table that is to be retrieved from the system of record 526 by the data integration provider service 530. That determined URI may be added as a "URI" entry 1112 to the same row of the table as the information that was added at the steps 1002, 1004, and 1006.

At a step 1010 of the routine 1000, computing device 610, e.g., per instructions entered by the system administrator 608, may determine a mapping between the standard columns of the "active events" table 1300 and the columns of the SOR table that is to be retrieved using the URI that was configured at the step 1008. In particular, in some implementations, the system administrator 608 may instruct the computing device 610 to create a new "mapping" table 1200 for the system of record 526 and to add entries 1202 to that table 1200 that identify the columns of the to-be-retrieved SOR table that are to mapped to the columns of the "active events" table 1300 that are indicated by the entries 1204.

FIG. 14 shows an example routine 1400 that may be executed by the calendar updating service 604 shown in FIG. 6 in some implementations of that service. As shown, the routine 1400 may begin at a decision step 1402 when the calendar updating service 604 detects a trigger event for updating a calendar of the user 524 to reflect one or more events for systems of record 526 the system 100 has been configured to monitor, as discussed above. In some implementations, the trigger event detected at the decision step 1402 may simply be a particular time of day, or the expiration of a timer for a particular time window, so as to cause the routine 1400 to be performed periodically, e.g., once per day, once every four hours, once every hour, etc. In other implementations, the trigger event detected at the decision step 1402 may additionally or alternatively be detection of the occurrence a particular event within the system 100, such as a modification to the "active events" table 1300 for the user 524 within the active data cache service 534. In any event, upon the detection (at the decision step 1402) of a calendar update trigger event, the routine 1400 may proceed to a step 1404, at which the calendar updating service 604 may determine the details for an event that has not yet been added to the user's calendar, for an event that is to be removed from the user's calendar, or an event for which one or more particulars have changed. Such details may be determined, for example, by examining the current entries in the "active events" table 1300 for the user 524 and/or identifying changes that have been made to such entries.

At a step 1406 of the routine 1400, the calendar updating service 604 may construct an indication of the event in question. In some implementations, the calendar updating service 604 may construct the event indication by arranging the details determined at the step 1404 into a particular format for presentation on a calendar that is to be generated by the calendar service 112 (shown in FIG. 1B). Further, in some implementations, the step 1406 may involve adding information to the event indication that specifies that the indication has been automatically generated by the system 100. And still further, in some implementation, the step 1406 may optionally include the steps 1602 and 1604 shown in FIG. 16, and may further construct the event indication to include one or more microapp UI elements 128, as described above in Section A. More specifically, as shown in FIG. 16, at the step 1602, the calendar updating service 604 may query the microapp service 528 to obtain one or more microapp UI elements 128 (or indicators of the same) that can be selected to take particular actions relating to the event with the system of record 526 in which the event was detected. And, at the step 1604, the calendar updating service 604 may construct the event indication so as to include those microapp UI elements 128 (or indicators of the same).

At a step 1408 of the routine 1400, the calendar updating service 604 may obtain the user's access credentials for the calendar service 112 from the credential wallet service 532.

At a step 1410 of the routine 1400, the calendar updating service 604 may instruct the data integration provider service 530 to use the access credentials determined at the step 1408 to add the event indication constructed at the step 1406 to the user's calendar. As discussed above in connection with FIG. 1A, the user 524 may thereafter view the event indication on a calendar 118 that the calendar service 112 makes available to a client device 202 the user 524 is operating.

FIG. 15 shows an example routine 1500 that may be executed by the event schedule generation service 606 shown in FIG. 7 in some implementations of that service. As shown, the routine 1500 may begin at a decision step 1502 when the event schedule generation service 606 detects a trigger event for generating an event schedule 106 that reflects one or more events for systems of record 526 the system 100 has been configured to monitor, as discussed above. In some implementations, the trigger event detected at the decision step 1502 may simply be a particular time of day, or the expiration of a timer for a particular time window, so as to cause the routine 1500 to be performed periodically, e.g., once per day, once every four hours, once every hour, etc. In other implementations, the trigger event detected at the decision step 1502 may additionally or alternatively be detection of the occurrence a particular event within the system 100, such as a modification to the "active events" table 1300 for the user 524 within the active data cache service 524. Further, in some implementation, the trigger event detected at the decision step 1502 may additionally or alternatively correspond to a user input or a message received from another system component, such as receipt of an event schedule request 124 from a client device 202, as shown in FIG. 1C.

In any event, upon the detection (at the decision step 1502) of an event schedule trigger event, the routine 1500 may proceed to a step 1504, at which the event schedule generation service 606 may determine a time period for which an event schedule 106 is to be generated. Such a time period may be determined in any of a number of ways, and may correspond to a set time period (e.g., "today's events" or "the next eight hours"), or may be specified by the user 524 operating the client device 202 and/or indicated as a part of the event schedule request 124. In some implementations, the determined time period may be only forward looking, and may thus include the current time of day through another set and/or selected time, e.g., the current time through midnight on the current day.

At a step 1506 of the routine 1500, the event schedule generation service 606 may evaluate the "active events" table 1300 (shown in FIG. 13) for the user 524 to identify the event records that fall within the time period determined at the step 1504. This analysis can be done in any of a number of ways. In some implementations, for example, any indicated events for which either a "start time" entry 1308 or an "end time" entry 1310 falls within the relevant time window may be identified. In other implementations, only indicated events that have a "start time" entry 1308 within the relevant time window may be identified. In still other implementations, only indicated events for which both a "start time" entry 1308 and an "end time" entry 1310 fall within the relevant time window may be identified.

At a step 1508 of the routine 1500, the event schedule generation service 606 may sort the event records identified at the step 1506 by time order, e.g., based on the "start time" entries 1308 for those events in the "active events" table 1300 (shown in FIG. 13).

At a step 1510 of the routine 1500, the event schedule generation service 606 may determine the details for the events identified at the step 1506. Such details may be determined, for example, by examining the current entries in the "active events" table 1300 for the user 524.

At a step 1512 of the routine 1500, the event schedule generation service 606 may construct indications of the events identified at the step 1506. In some implementations, the event schedule generation service 606 may construct such event indications by arranging the details determined at the step 1510 for respective events into a particular format for presentation in an event list 122 (shown in FIG. 1C) that is to be provided to a client device 202 for presentation to the user 524. Further, in some implementations, the step 1512 may optionally include the steps 1602 and 1604 shown in FIG. 16, and may further construct the respective event indications to include one or more microapp UI elements 128, as described above in Section A. More specifically, as shown in FIG. 16, at the step 1602, the event schedule generation service 606 may, for respective events, query the microapp service 528 to obtain one or more microapp UI elements 128 (or indicators of the same) that can be selected to take particular actions relating to the event with the system of record 526 in which the event was detected. And, at the step 1604, the event schedule generation service 606 may construct the respective event indications so as to include those microapp UI elements 128 (or indicators of the same).

At a step 1514 of the routine 1500, the event schedule generation service 606 may construct the event schedule 106 so as to include the event indications constructed at the step 1512 and arranged in the time order determined at the step 1508.

At a step 1514 of the routine 1500, the event schedule generation service 606 may sent the event schedule 106 constructed at the step 1514 to a client device 202, e.g., as an event list 122 (shown in FIG. 1A) for presentation to the user 524, e.g., as the window 130 (shown in FIG. 1D.

G. Example Implementations of Methods, Systems, and Computer-Readable Media in Accordance with the Present Disclosure The following paragraphs (M1) through (M10) describe examples of methods that may be implemented in accordance with the present disclosure.

(M1) A method may be performed that involves determining, by a first computing system, that a first event is represented in first data received from a second computing system; generating, by the first computing system and based at least in part on the first event being represented in the first data, a time-ordered schedule of events that includes an indication of the first event; and sending, from the first computing system to a client device, second data representing the time-ordered schedule of events.

(M2) A method may be performed as described in paragraph (M1), and may further involve determining, by the first computing system, first access credentials for an account of the second computing system, the account associated with a user of the client device; and using, by the first computing system, the first access credentials to retrieve the first data from the second computing system.

(M3) A method may be performed as described in paragraph (M2), and may further involve determining, by the first computing system, a uniform resource locator (URL) for the second computing system; and using, by the first computing system, the first access credentials to authenticate to a service accessed via the URL.

(M4) A method may be performed as described in any of paragraphs (M1) through (M3), and may further involve determining, by the first computing system, a uniform resource identifier (URI) for a table accessible from the second computing system; retrieving, by the first computing system, the table identified by the URI; and identifying, by the first computing system, the first data within the table.

(M5) A method may be performed as described in any of paragraphs (M2) through (M4), and may further involve storing, in at least one storage medium, the first access credentials in association an identifier of the user; and using, by the first computing system, the identifier to retrieve the first access credentials from the at least one storage medium.

(M6) A method may be performed as described in any of paragraphs (M1) through (M5), wherein the first computing system may comprise a third computing system configured to determine that the first event is represented in the first data retrieved from the second computing system, and a fourth computing system configured to maintain at least a first calendar and to send the second data to the client device, and the method may further involve sending, from the third computing system to the fourth computing system, third data indicating an update to the first calendar.

(M7) A method may be performed as described in any of paragraphs (M1) through (M6), and may further involve receiving, by the first computing system and from the client device, a request for the time-ordered schedule of events; and sending the second data from the first computing system to the client device in response to the request.

(M8) A method may be performed as described in any of paragraphs (M1) through (M7), and may further involve determining, by the first computing system, at least a first user interface element for the indication of the first event, the first user interface element being selectable to cause a first action to be performed with respect to the second computing system; and configuring the second data to cause the client device to present the first user interface element.

(M9) A method may be performed as described in paragraph (M8), and may further involve determining, by the first computing system, that the first user interface element was selected; and in response to selection of the first user interface element, sending, from the first computing system to the second computing system, an instruction to change at least one record of the second computing system relating to the first event.

(M10) A method may be performed as described in any of paragraphs (M1) through (M9), and may further involve determining, by the first computing system, that a second event is represented in third data received from a third computing system; and generating, by the first computing system and based at least in part on the second event being represented in the third data, the time-ordered schedule of events to include an indication of the second event.

The following paragraphs (S1) through (S10) describe examples of systems and devices that may be implemented in accordance with the present disclosure.

(S1) A first computing system may comprise at least one processor and at least one computer-readable medium encoded with instructions which, when executed by the at least one processor, cause the first computing system to determine that a first event is represented in first data received from a second computing system, to generate, based at least in part on the first event being represented in the first data, a time-ordered schedule of events that includes an indication of the first event, and to send, to a client device, second data representing the time-ordered schedule of events.

(S2) A first computing system may be configured as described in paragraph (S1), wherein the at least one computer-readable medium may be further encoded with additional instructions which, when executed by the at least one processor, further cause the first computing system to determine first access credentials for an account of the second computing system, the account associated with a user of the client device, and to use the first access credentials to retrieve the first data from the second computing system.

(S3) A first computing system may be configured as described in paragraph (S2), wherein the at least one computer-readable medium may be further encoded with additional instructions which, when executed by the at least one processor, further cause the first computing system to determine a uniform resource locator (URL) for the second computing system, and to use the first access credentials to authenticate to a service accessed via the URL.

(S4) A first computing system may be configured as described in any of paragraphs (S1) through (S3), wherein the at least one computer-readable medium may be further encoded with additional instructions which, when executed by the at least one processor, further cause the first computing system to determine a uniform resource identifier (URI) for a table accessible from the second computing system, to retrieve the table identified by the URI, and to identify the first data within the table.

(S5) A first computing system may be configured as described in any of paragraphs (S2) through (S4), wherein the at least one computer-readable medium may be further encoded with additional instructions which, when executed by the at least one processor, further cause the first computing system to store, in at least one storage medium, the first access credentials in association an identifier of the user, and to use the identifier to retrieve the first access credentials from the at least one storage medium.

(S6) A first computing system may be configured as described in any of paragraphs (S1) through (S5), wherein the first computing system may comprise a third computing system configured to determine that the first event is represented in the first data retrieved from the second computing system, and a fourth computing system configured to maintain at least a first calendar and to send the second data to the client device, and the at least one computer-readable medium may be further encoded with additional instructions which, when executed by the at least one processor, further cause the third computing system to send, to the fourth computing system, third data indicating an update to the first calendar.

(S7) A first computing system may be configured as described in any of paragraphs (S1) through (S6), wherein the at least one computer-readable medium may be further encoded with additional instructions which, when executed by the at least one processor, further cause the first computing system to receive, from the client device, a request for the time-ordered schedule of events, and to send the second data to the client device in response to the request.

(S8) A first computing system may be configured as described in any of paragraphs (S1) through (S7), wherein the at least one computer-readable medium may be further encoded with additional instructions which, when executed by the at least one processor, further cause the first computing system to determine at least a first user interface element for the indication of the first event, the first user interface element being selectable to cause a first action to be performed with respect to the second computing system, and to configure the second data to cause the client device to present the first user interface element.

(S9) A first computing system may be configured as described in paragraph (S8), wherein the at least one computer-readable medium may be further encoded with additional instructions which, when executed by the at least one processor, further cause the first computing system to determine that the first user interface element was selected, and, in response to selection of the first user interface element, to send, to the second computing system, an instruction to change at least one record of the second computing system relating to the first event.

(S10) A first computing system may be configured as described in any of paragraphs (S1) through (S9), wherein the at least one computer-readable medium may be further encoded with additional instructions which, when executed by the at least one processor, further cause the first computing system to determine that a second event is represented in third data received from a third computing system, and to generate, based at least in part on the second event being represented in the third data, the time-ordered schedule of events to include an indication of the second event.

The following paragraphs (CRM1) through (CRM10) describe examples of computer-readable media that may be implemented in accordance with the present disclosure.

(CRM1) At least one non-transitory computer-readable medium may be encoded with instructions which, when executed by at least one processor of a first computing system, cause the first computing system to determine that a first event is represented in first data received from a second computing system, to generate, based at least in part on the first event being represented in the first data, a time-ordered schedule of events that includes an indication of the first event, and to send, to a client device, second data representing the time-ordered schedule of events.

(CRM2) At least one non-transitory computer-readable medium may be configured as described in paragraph (CRM1), and may be further encoded with additional instructions which, when executed by the at least one processor, further cause the first computing system to determine first access credentials for an account of the second computing system, the account associated with a user of the client device, and to use the first access credentials to retrieve the first data from the second computing system.

(CRM3) At least one non-transitory computer-readable medium may be configured as described in paragraph (CRM2), and may be further encoded with additional instructions which, when executed by the at least one processor, further cause the first computing system to determine a uniform resource locator (URL) for the second computing system, and to use the first access credentials to authenticate to a service accessed via the URL.

(CRM4) At least one non-transitory computer-readable medium may be configured as described in any of paragraphs (CRM1) through (CRM3), and may be further encoded with additional instructions which, when executed by the at least one processor, further cause the first computing system to determine a uniform resource identifier (URI) for a table accessible from the second computing system, to retrieve the table identified by the URI, and to identify the first data within the table.

(CRM5) At least one non-transitory computer-readable medium may be configured as described in any of paragraphs (CRM2) through (CRM4), and may be further encoded with additional instructions which, when executed by the at least one processor, further cause the first computing system to store, in at least one storage medium, the first access credentials in association an identifier of the user, and to use the identifier to retrieve the first access credentials from the at least one storage medium.

(CRM6) At least one non-transitory computer-readable medium may be configured as described in any of paragraphs (CRM1) through (CRM5), wherein the first computing system may comprise a third computing system configured to determine that the first event is represented in the first data retrieved from the second computing system, and a fourth computing system configured to maintain at least a first calendar and to send the second data to the client device, and the at least one computer-readable medium may be further encoded with additional instructions which, when executed by the at least one processor, further cause the third computing system to send, to the fourth computing system, third data indicating an update to the first calendar.

(CRM7) At least one non-transitory computer-readable medium may be configured as described in any of paragraphs (CRM1) through (CRM6), and may be further encoded with additional instructions which, when executed by the at least one processor, further cause the first computing system to receive, from the client device, a request for the time-ordered schedule of events, and to send the second data to the client device in response to the request.

(CRM8) At least one non-transitory computer-readable medium may be configured as described in any of paragraphs (CRM1) through (CRM7), and may be further encoded with additional instructions which, when executed by the at least one processor, further cause the first computing system to determine at least a first user interface element for the indication of the first event, the first user interface element being selectable to cause a first action to be performed with respect to the second computing system, and to configure the second data to cause the client device to present the first user interface element.

(CRM9) At least one non-transitory computer-readable medium may be configured as described in paragraph (CRM8), and may be further encoded with additional instructions which, when executed by the at least one processor, further cause the first computing system to determine that the first user interface element was selected, and, in response to selection of the first user interface element, to send, to the second computing system, an instruction to change at least one record of the second computing system relating to the first event.

(CRM10) At least one non-transitory computer-readable medium may be configured as described in any of paragraphs (CRM1) through (CRM9), and may be further encoded with additional instructions which, when executed by the at least one processor, further cause the first computing system to determine that a second event is represented in third data received from a third computing system, and to generate, based at least in part on the second event being represented in the third data, the time-ordered schedule of events to include an indication of the second event.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining, by a first computing system, a first uniform resource identifier (URI) for a first table accessible from a first application executing on a second computing system that is remote from the first computing system;
    retrieving, by the first computing system and from the first application via a network, first data representing the first table identified by the first URI, the first table including at least a first row including first columns;
    determining first mapping data indicative of a mapping of a subset of the first columns of the first table to a set of event characteristics;
    determining, by the first computing system and using the first mapping data, first records from the first row that correspond to the set of event characteristics for a first event;
    generating, by the first computing system and based at least in part on the determined first records, a time-ordered schedule of events that includes an indication of the first event; and
    sending, from the first computing system to a client device, second data representing the time-ordered schedule of events.

2. The method of claim 1, further comprising:
    determining, by the first computing system, first access credentials for an account of the first application, the account associated with a user of the client device; and
    using, by the first computing system, the first access credentials to retrieve the first data from the first application via the network.

3. The method of claim 2, further comprising:
    determining, by the first computing system, a uniform resource locator (URL) for the first application; and
    using, by the first computing system, the first access credentials to authenticate to the first application accessed via the URL.

4. The method of claim 2, further comprising:
   storing, in at least one storage medium, the first access credentials in association with an identifier of the user; and
   using, by the first computing system, the identifier to retrieve the first access credentials from the at least one storage medium.

5. The method of claim 1, wherein the first computing system comprises a third computing system configured to use the first mapping data to determine the first records that correspond to the set of event characteristics for the first event, and a fourth computing system configured to maintain at least a first calendar and to send the second data to the client device, and the method further comprises:
   sending, from the third computing system to the fourth computing system, third data indicating an update to the first calendar.

6. The method of claim 1, further comprising:
   receiving, by the first computing system and from the client device, a request for the time-ordered schedule of events; and
   sending the second data from the first computing system to the client device in response to the request.

7. The method of claim 1, further comprising:
   determining, by the first computing system, at least a first user interface element for the indication of the first event, the first user interface element being selectable to cause a first action to be performed with respect to the first application; and
   configuring the second data to cause the client device to present the first user interface element.

8. The method of claim 7, further comprising:
   determining, by the first computing system, that the first user interface element was selected; and
   in response to selection of the first user interface element, sending, from the first computing system to the first application, an instruction to change at least one record of the first application relating to the first event.

9. The method of claim 1, further comprising:
   determining, by the first computing system, a second uniform resource identifier (URI) for a second table accessible from a second application executing on a third computing system that is remote from the first computing system;
   retrieving, by the first computing system and from the second application via the network, third data representing the second table identified by the second URI, the second table including at least a second row including second columns;
   determining second mapping data indicative of a mapping of a subset of the second columns of the second table to the set of event characteristics, the second mapping data being different than the first mapping data;
   determining, by the first computing system and using the second mapping data, second records from the second row that correspond to the set of event characteristics for a second event; and
   generating, by the first computing system and based at least in part on the determined second records, the time-ordered schedule of events to include an indication of the second event.

10. A first computing system, comprising:
    at least one processor; and
    at least one computer-readable medium encoded with instructions which, when executed by the at least one processor, cause the first computing system to:
       determine a first uniform resource identifier (URI) for a first table accessible from a first application executing on a second computing system that is remote from the first computing system,
       retrieve, from the first application via a network, first data representing the first table identified by the first URI, the first table including at least a first row including first columns,
       determine first mapping data indicative of a mapping of a subset of the first columns of the first table to a set of event characteristics,
       determine, using the first mapping data, first records from the first row that correspond to the set of event characteristics for a first event,
       generate, based at least in part on the determined first records, a time-ordered schedule of events that includes an indication of the first event, and
       send, to a client device, second data representing the time-ordered schedule of events.

11. The first computing system of claim 10, wherein the at least one computer-readable medium is further encoded with additional instructions which, when executed by the at least one processor, further cause the first computing system to:
    determine first access credentials for an account of the first application, the account associated with a user of the client device; and
    use the first access credentials to retrieve the first data from the first application.

12. The first computing system of claim 11, wherein the at least one computer-readable medium is further encoded with additional instructions which, when executed by the at least one processor, further cause the first computing system to:
    determine a uniform resource locator (URL) for the first application; and
    use the first access credentials to authenticate to the first application accessed via the URL.

13. The first computing system of claim 11, wherein the at least one computer-readable medium is further encoded with additional instructions which, when executed by the at least one processor, further cause the first computing system to:
    store, in at least one storage medium, the first access credentials in association with an identifier of the user; and
    use the identifier to retrieve the first access credentials from the at least one storage medium.

14. The first computing system of claim 10, wherein:
    the first computing system comprises a third computing system configured to use the first mapping data to determine the first records that correspond to the set of event characteristics for the first event, and a fourth computing system configured to maintain at least a first calendar and to send the second data to the client device; and
    the at least one computer-readable medium is further encoded with additional instructions which, when executed by the at least one processor, further cause the third computing system to send, to the fourth computing system, third data indicating an update to the first calendar.

15. The first computing system of claim 10, wherein the at least one computer-readable medium is further encoded with additional instructions which, when executed by the at least one processor, further cause the first computing system to:

receive, from the client device, a request for the time-ordered schedule of events; and send the second data to the client device in response to the request.

16. The first computing system of claim 10, wherein the at least one computer-readable medium is further encoded with additional instructions which, when executed by the at least one processor, further cause the first computing system to:

determine at least a first user interface element for the indication of the first event, the first user interface element being selectable to cause a first action to be performed with respect to the first application; and configure the second data to cause the client device to present the first user interface element.

17. The first computing system of claim 16, wherein the at least one computer-readable medium is further encoded with additional instructions which, when executed by the at least one processor, further cause the first computing system to:

determine that the first user interface element was selected; and in response to selection of the first user interface element, send, to the first application, an instruction to change at least one record of the first application relating to the first event.

18. The first computing system of claim 10, wherein the at least one computer-readable medium is further encoded with additional instructions which, when executed by the at least one processor, further cause the first computing system to:

determine a second uniform resource identifier (URI) for a second table accessible from a second application executing on a third computing system that is remote from the first computing system;

retrieve, from the second application via the network, third data representing the second table identified by the second URI, the second table including at least a second row including second columns;

determine second mapping data indicative of a mapping of a subset of the second columns of the second table to the set of event characteristics, the second mapping data being different than the first mapping data;

determine, using the second mapping data, second records from the second row that correspond to the set of event characteristics for a second event; and generate, based at least in part on the determined second records, the time-ordered schedule of events to include an indication of the second event.

19. At least one non-transitory computer-readable medium encoded with instructions which, when executed by at least one processor of a first computing system, cause the first computing system to:

determine a first uniform resource identifier (URI) for a first table accessible from a first application executing on a second computing system that is remote from the first computing system;

retrieve, from the first application via a network, first data representing the first table identified by the first URI, the first table including at least a first row including first columns;

determine first mapping data indicative of a mapping of a subset of the first columns of the first table to a set of event characteristics;

determine, using the first mapping data, first records from the first row that correspond to the set of event characteristics for a first event;

generate, based at least in part on the determined first records, a time-ordered schedule of events that includes an indication of the first event; and send, to a client device, second data representing the time-ordered schedule of events.

20. The at least one non-transitory computer-readable medium of claim 19, further encoded with additional instructions which, when executed by the at least one processor, further cause the first computing system to:

determine first access credentials for an account of the first application, the account associated with a user of the client device; and use the first access credentials to retrieve the first data from the first application.

21. The at least one non-transitory computer-readable medium of claim 19, further encoded with additional instructions which, when executed by the at least one processor, further cause the first computing system to:

determine a second uniform resource identifier (URI) for a second table accessible from a second application executing on a third computing system that is remote from the first computing system;

retrieve, from the second application via the network, third data representing the second table identified by the second URI, the second table including at least a second row including second columns;

determine second mapping data indicative of a mapping of a subset of the second columns of the second table to the set of event characteristics, the second mapping data being different than the first mapping data;

determine, using the second mapping data, second records from the second row that correspond to the set of event characteristics for a second event; and generate, based at least in part on the determined second records, the time-ordered schedule of events to include an indication of the second event.

* * * * *